US007831455B2

(12) United States Patent
Yoshida et al.

(10) Patent No.: US 7,831,455 B2
(45) Date of Patent: Nov. 9, 2010

(54) METHOD AND SYSTEM FOR POSTING IDEAS AND WEIGHTING VOTES

(75) Inventors: Norimasa Yoshida, Daly City, CA (US); Justin Lin, Redwood City, CA (US); Likuo Lin, Redwood City, CA (US)

(73) Assignee: Salesforce.com, Inc., San Francisco, CA (US)

( * ) Notice: Subject to any disclaimer, the term of this patent is extended or adjusted under 35 U.S.C. 154(b) by 707 days.

(21) Appl. No.: 11/716,365

(22) Filed: Mar. 8, 2007

(65) Prior Publication Data

US 2008/0222191 A1 Sep. 11, 2008

(51) Int. Cl.
G06F 17/00 (2006.01)
(52) U.S. Cl. .......................................................... 705/7
(58) Field of Classification Search ...................... 705/7
See application file for complete search history.

(56) References Cited

U.S. PATENT DOCUMENTS

| | | | |
|---|---|---|---|
| 5,790,677 A | 8/1998 | Fox et al. | |
| 6,434,550 B1 | 8/2002 | Warner et al. | |
| 6,665,655 B1 | 12/2003 | Warner et al. | |
| 6,842,748 B1 | 1/2005 | Warner et al. | |
| 7,373,606 B2 * | 5/2008 | Gorzela | 715/738 |
| 7,529,795 B2 * | 5/2009 | Arav | 709/204 |
| 2001/0053997 A1 * | 12/2001 | Bain | 705/14 |
| 2003/0187706 A1 | 10/2003 | Buchmiller et al. | 705/7 |
| 2004/0162751 A1 * | 8/2004 | Tsyganskiy et al. | 705/10 |
| 2004/0181417 A1 * | 9/2004 | Piller et al. | 705/1 |
| 2006/0277305 A1 | 12/2006 | Bernardin et al. | |
| 2007/0179856 A1 * | 8/2007 | O'Kelley | 705/14 |
| 2007/0226628 A1 * | 9/2007 | Schlack | 715/733 |
| 2008/0254436 A1 * | 10/2008 | Morgia et al. | 434/362 |
| 2008/0256002 A1 | 10/2008 | Yoshida et al. | |
| 2008/0281610 A1 | 11/2008 | Yoshida et al. | |

(Continued)

FOREIGN PATENT DOCUMENTS

WO WO 2005/013079 * 2/2005

OTHER PUBLICATIONS

Digg; Feb. 8, 2007; wayback machine archive website.*

(Continued)

*Primary Examiner*—Thomas Dixon
(74) *Attorney, Agent, or Firm*—David Lewis; Jennifer A. Haynes

(57) ABSTRACT

A site is maintained that allows consumers to suggest, comment on and/or vote on ideas about a product or service. Some site embodiments can enable sponsoring organizations (customers) to maintain their own sites for displaying articles and allowing multiple viewers to vote on these articles. Site information for multiple tenants may be maintained in a common multi-tenant system. Votes may indicate a variety of different types of criteria, such as the importance, correctness, and/or user preference for the articles or other Qualitative Management Criteria (QMC) for determining the merit of an idea or an article. The votes may be tallied into an overall Total Qualitative Management Criterion (TQMC) for the idea or article. Newer votes may be adjusted according to an increasing function of time to enable the relative weightings of the older votes to diminish over time without having to compute a decaying time function to determine weightings for each vote.

55 Claims, 14 Drawing Sheets

U.S. PATENT DOCUMENTS

| | | | | |
|---|---|---|---|---|
| 2008/0288914 A1* | 11/2008 | Schmitter | ............... | 717/101 |
| 2008/0313040 A1* | 12/2008 | Rose et al. | ............... | 705/14 |
| 2009/0119329 A1* | 5/2009 | Kwon et al. | ............... | 707/102 |
| 2009/0204507 A1* | 8/2009 | Cockayne et al. | ............... | 705/26 |

OTHER PUBLICATIONS

Digg—Frequently Asked Questions; Feb. 8, 2007; wayback machine archive website.*

Digg—Tools; Dec. 8, 2006; wayback machine archive website.*

Digg—Gaming; Dec. 30, 2006; wayback machine archive.*

Title: "Amazon.com: Harry Potter and the Deathly Hallows (Book 7): Books: J.K. Rowling" URL: "http://web.archive.org/web/20070204090617/www.amazon.com/Harry-Potter-Deathly-Hallows-Book/dp/0545010225", URL Date: Mar. 7, 2007, Home Page: "http://www.amazon.com".

Title: "Amazon.com: Reviews for Metal Gear Solid Portable Ops: Video Games" URL: "http://www.amazon.com/gp/product/customer-reviews/B000HKMG14/sr=8-1/qid=1189452560" URL Date: Sep. 12, 2007, Home Page: "http://www.amazon.com".

Title: "Digg / News" URL: "http://web.archive.org/web/20070305222708/http://www.digg.com", URL Date: Mar. 5, 2007, Home Page: "http://www.digg.com".

Title: "Digg—Unique Super Mario Bros. 2 Prototype Cartridge Discovered and Documented" URL: "http://web.archive.org/web/20070307081653/digg.com/gaming_news/Unique_Super_Mario_Bros_2_Prototype_Cartridge_Discovered_and_Documented", URL Date: Mar. 5, 2007, Home Page: "http://www.digg.com".

"Reddit.com: newest submissions" URL: "http://web.archive.org/web/20070225115158/reddit.com/new" URL Date: Feb. 28, 2007, Home Page: "http://www.reddit.com".

Title: "Digg / News" URL:"http://web.archive.org/web/20070305222708/http://www.digg.com", URL Date: Mar. 5, 2007, Home Page: "http://www.digg.com".

\* cited by examiner

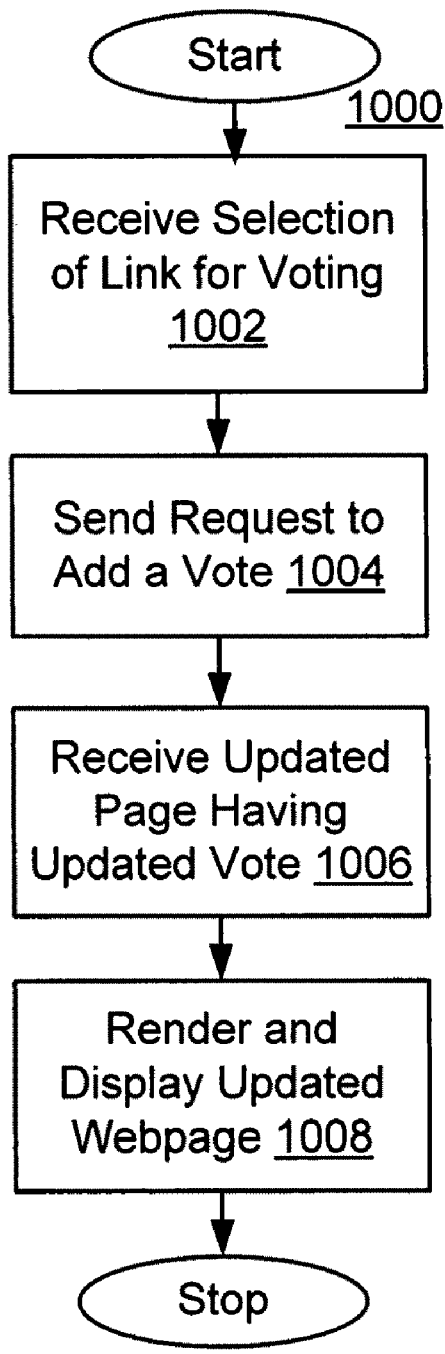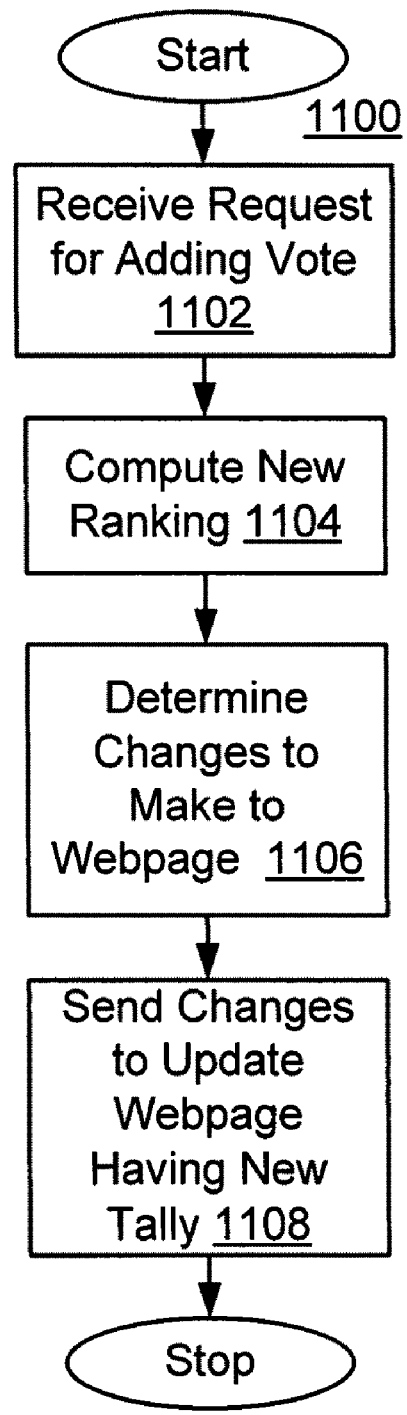
FIG. 10
FIG. 11

METHOD AND SYSTEM FOR POSTING IDEAS AND WEIGHTING VOTES

CROSS REFERENCE TO RELATED APPLICATIONS

The following commonly owned, U.S. patents and Patent Applications, including the present application, are related to each other. Each of the other patents/applications are incorporated by reference herein in its entirety:

U.S. patent application Ser. No. 11/716,365, entitled METHOD AND SYSTEM FOR POSTING IDEAS AND WEIGHTING VOTES, by Norimasa Yoshida, et al., filed Mar. 8, 2007;

U.S. patent application Ser. No. 11/786,882, entitled METHOD AND SYSTEM FOR POSTING IDEAS TO A RECONFIGURABLE WEBSITE, by Norimasa Yoshida, et al., filed Apr. 13, 2010; and U.S. patent application Ser. No. 11/801,572, entitled METHOD AND SYSTEM FOR INTEGRATING IDEA AND ON-DEMAND SERVICES, by Norimasa Yoshida, et al., filed May 9, 2007.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to sharing ideas in an online environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventionally, applications, such as databases, file systems, word processors and the like, were delivered to the end users in the form of software. Feedback mechanisms for these products exist typically in the form of problem reports, quality surveys and the like.

With the advent of the web, however, software-like utility is increasingly delivered to users as a service. These so named "software as a service" approaches may include a group of end users, who may wish to use the service offering collaboratively, or who may wish to share their input as a community, making the old problem report or feedback survey cumbersome or unsatisfactory.

Accordingly, it is desirable to provide techniques enabling sharing ideas to improve service offerings.

BRIEF SUMMARY

In an embodiment, a site that provides a service may be maintained in association with a website. The website may enable sponsoring organizations (customers) to maintain their own sites for displaying articles and allowing multiple viewers to vote on these articles. An idea may be posted as an article describing the idea. Accordingly, the words "idea" and "article" are used interchangeably herein. Votes may indicate the degree of merit to an idea based on various Qualitative Management Criteria (QMC), such as without limitation importance, correctness, user preference for the articles and the like. The votes may be tallied into an overall Total Qualitative Management Criterion (TQMC). Various factors that may determine the weight of a vote are the time of the vote, style of voting, or site management selected weightings prior to being tallied. For example, votes may be weighted with weights that cause older votes to have less importance than more recent votes. Website embodiments apply an increasing function of time to newer votes to enable the relative weightings of older votes to diminish over time without having to compute a decaying time function to determine weightings for each vote. The articles may be displayed to other users in the community in ranked order in which the ranking is based on a value associated with the Total Qualitative Management Criterion.

In accordance with embodiments, there are provided mechanisms and methods for posting ideas. These mechanisms and methods for posting ideas can enable embodiments to provide the sharing of ideas between the host and client about ways to improve the product and/or service that a service provider, not necessarily the owner of the host, provides to the client. The ability of embodiments to provide the sharing of ideas can enable the providing of a better product and/or of better customer satisfaction. In an embodiment and by way of example, a method for sharing ideas is provided. The method embodiment includes providing a website for the posting of ideas, a mechanism via which the customers can express their opinion, such as by voting, and a mechanism for ranking the ideas according to the votes.

In one embodiment, advertising based revenues may be earned from advertisers posting advertising on the sites. In another embodiment, the sponsoring organizations may pay a fee for having a website upon which customers and the sponsoring organizations can post ideas. In yet another embodiment, the sponsoring organization is offered a choice of whether to pay a fee for the website and keep the site free of advertisers or whether to allow the advertisers to advertise on the website. In another embodiment, advertising revenues may be shared between the sponsoring organizations and the company providing the website.

While the present invention is described with reference to an embodiment in which techniques for posting ideas are implemented in a system having an application server providing a front end for an on-demand community capable of supporting websites of a potentially large plurality of sponsoring organizations (or "tenants"), the present invention is not limited to multi-tenant implementations nor deployment on application servers. Embodiments may be practiced using other components and/or architectures, than the examples provided here without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 10 shows a flowchart of an example of a method implemented by the client as part of a voting algorithm;

FIG. 11 shows a flowchart of an example of a method implemented by the web sever of FIG. 7 as part a voting algorithm;

DETAILED DESCRIPTION

Systems and methods are provided for posting ideas. Ideas may be posted to the website for viewing, commenting and discussion and/or voting upon by members of a community. As used herein, the terms idea and article may be used interchangeably to refer to an item posted to the idea website for one or more of viewing, commenting and voting upon.

Embodiments include the idea website as a stand alone website, use of the idea website in conjunction with an on-line service to support a community of users, and a service offering (or product) that hosts idea websites on behalf of tenants (customers) who would like to provide website communities for their own users.

Site information for multiple tenants may be maintained in a common multi-tenant system. Votes may indicate things like importance, correctness, user preference for the articles or other such Qualitative Management Criteria (QMC). The votes can be tallied into an overall Total Qualitative Management Criterion (TQMC). Votes can be weighted by time since the time of the vote, style of voting, or site management selected weightings prior to being tallied. The ideas may be displayed to other users in the community in ranked order by the Total Qualitative Management Criterion. Although in many places in the specification methods of computing the TQMC using time dependent weightings are discussed, except where otherwise indicated by the context the same methods related to the time dependent weightings may be applied for computing QMCs (as well as TQMCs that are formed by the QMCs) and other rankings. Consequently in the discussions of weightings for TQMCs, other embodiments may be obtained by substituting QMCs, the QMCs and the resulting TQMCs, or other rankings for TQMCs specified.

While embodiments are useful in a variety of configurations and applications, an example application in which a website is provided in conjunction with an on-demand multi-tenant database service will be used to illustrate, but not limit, the many features and benefits provided by embodiments of the invention. An on-demand multi-tenant database service is not required, however. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for providing the posting of ideas will be described with reference to example embodiments.

System Overview

Figure 1A:
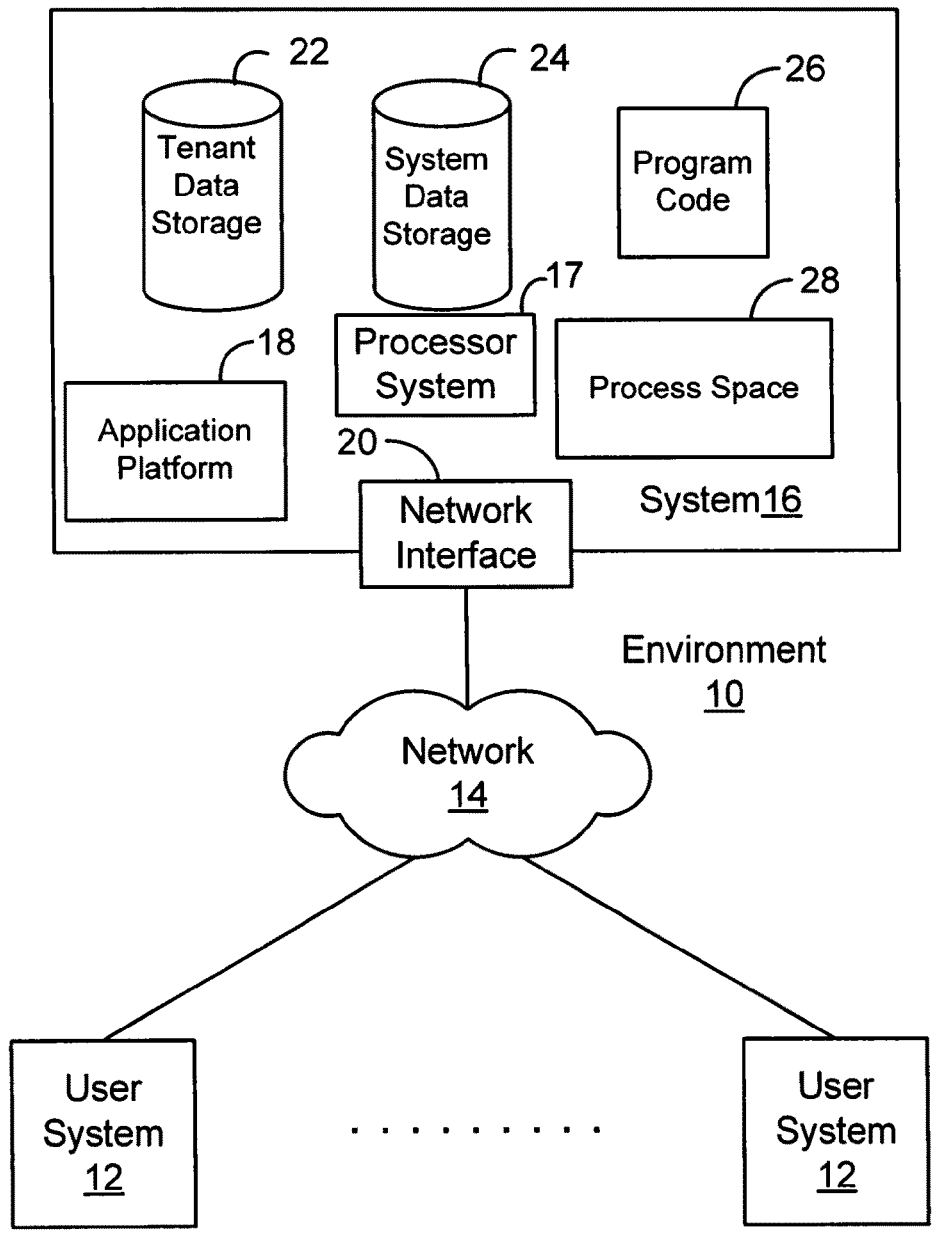
FIG. 1A illustrates a block diagram of an example of an environment wherein an idea posting website might be used in conjunction with an on-demand database service embodiment.

FIG. 1A illustrates a block diagram of an environment 10 wherein an idea posting website might be used in conjunction with an on-demand database service embodiment. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. In an example application of one embodiment, an idea website is provided to enable users of customers of the on-demand database service to share ideas about the service. User system 12 may be any machine or system that is used by a user to access a database user system. For example, any of user systems 12 can be a handheld computing device, a mobile phone, a laptop computer, a work station, and/or a network of computing devices. As illustrated in FIG. 1A (and in more detail in FIG. 2) user systems 12 might interact via a network 14 with an on-demand database service, which is system 16.

An on-demand database service, such as system 16, is a pre-established database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables the creating, managing, and executing of one or more applications that were developed by the provider of the on-demand database service, the users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1A, implements a web-based customer relationship management (CRM) system. For example, in one embodiment, system 16 includes application servers configured to implement and execute CRM software applications as well as provide related data, code, forms, webpages, and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages the creation of and/or the storage of the applications into one or more database objects and which manages the execution of the applications in a virtual machine in the process space of the system 16.

One arrangement for elements of system 16 is shown in FIG. 1A, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, the MTSs may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 1B:
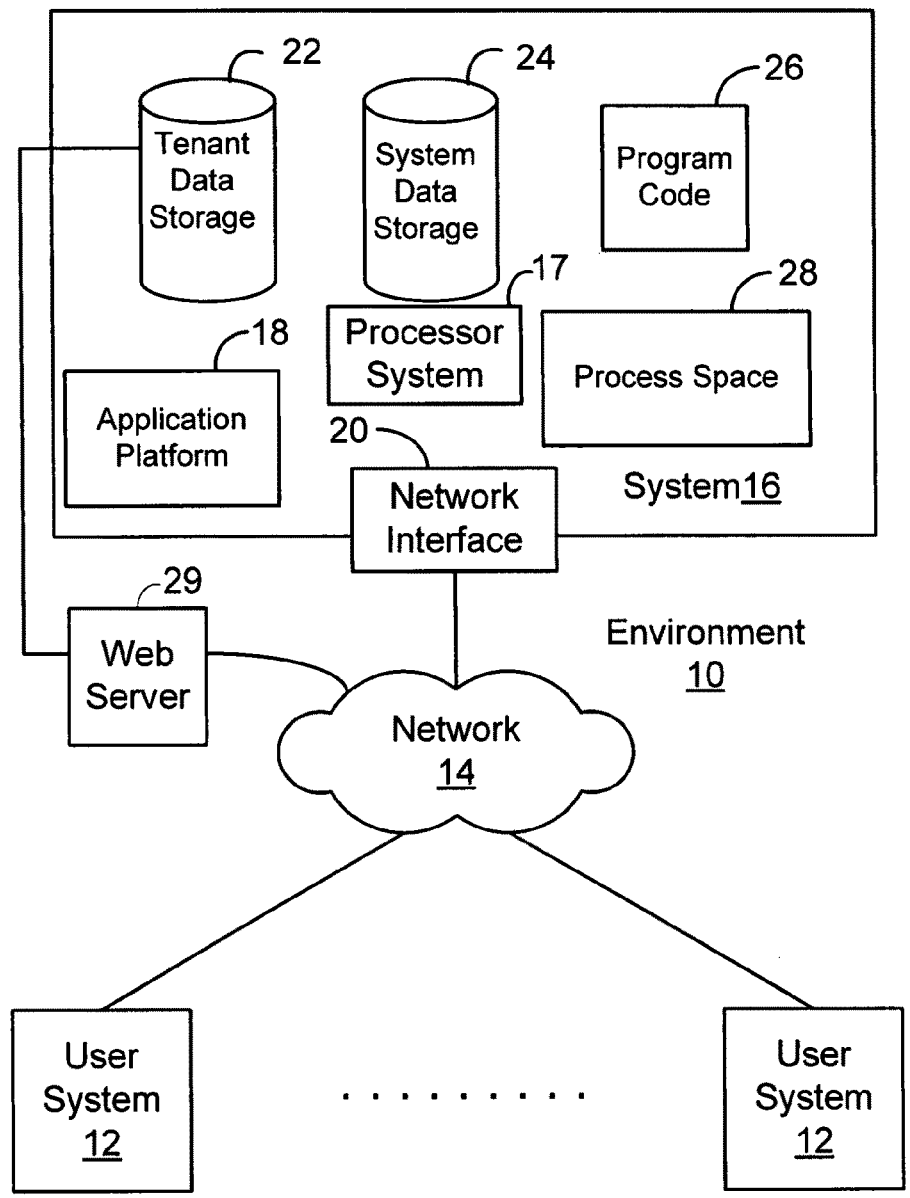
FIG. 1B illustrates a block diagram of an example of an alternative embodiment of environment wherein an idea posting website might be used in conjunction with an on-demand database service embodiment.

FIG. 1B illustrates a block diagram of an environment 10 wherein an idea posting website might be used in conjunction with an on-demand database service embodiment. Environment 10 may include user systems 12, network 14, system 16, processor system 17, application platform 18, network interface 20, tenant data storage 22, system data storage 24, program code 26, process space 28, and web server 29. In other embodiments, environment 10 may not have all of the components listed and/or may have other elements instead of, or in addition to, those listed above.

Environment 10, user systems 12, network 14, system 16, processor system 17, application platform 18, network interface 20, tenant data storage 22, system data storage 24, program code 26, process space 28 were discussed above in FIG. 1A and will be discussed further in conjunction with FIG. 2. Web server 29 is an additional web server that may be separate from network interface 20 and/or system 16. In other words, web server 29 may be part of system 16 or a separate entity. Web server 29 has either direct access or access via network 14 to tenant database 22. Web server 29 hosts websites on behalf of the tenants of system 16, where each website may be customized to at least some of the individual needs of that particular tenant, based on information in tenant database 22.

Figure 2:
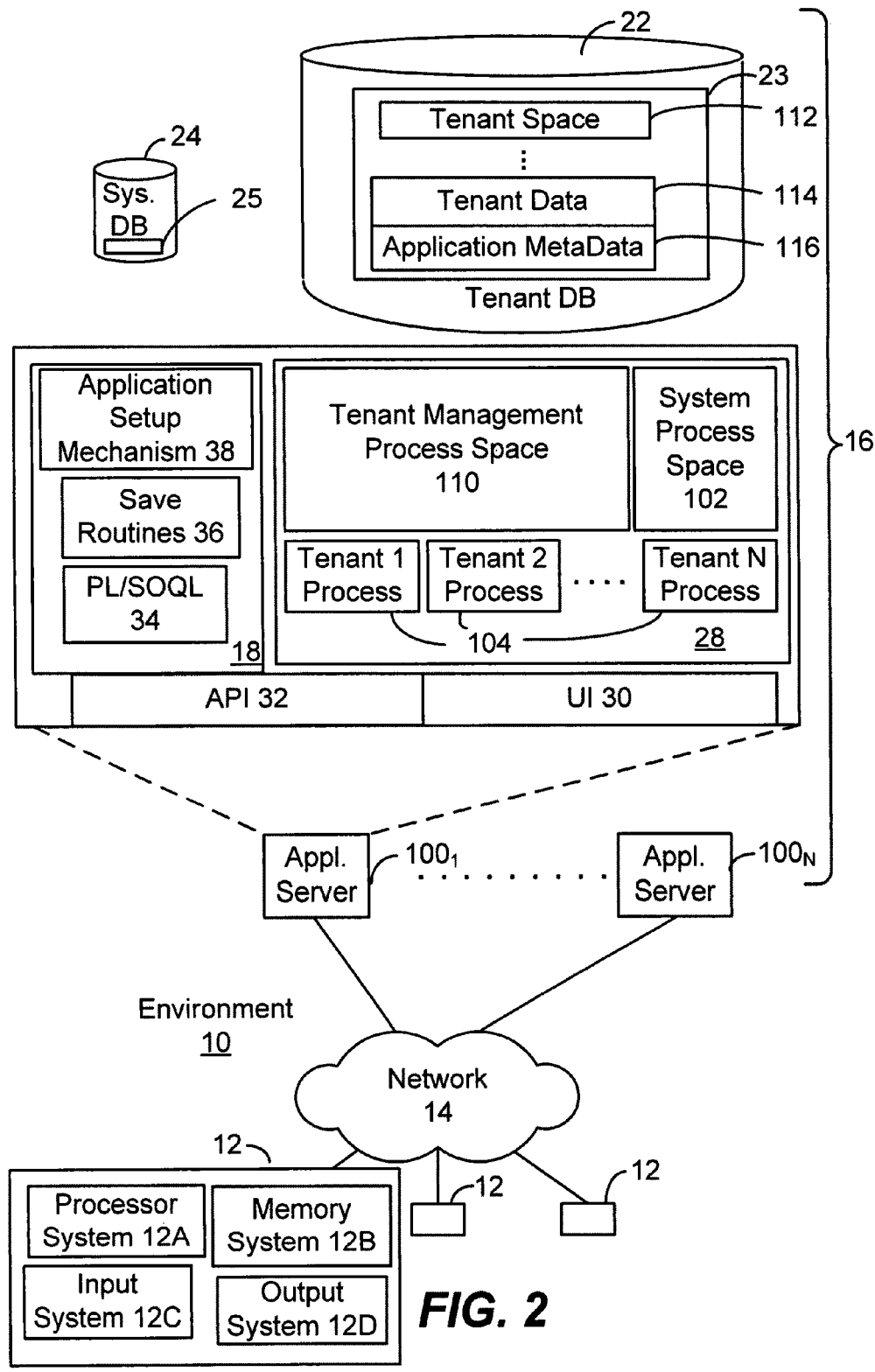
FIG. 2 illustrates a block diagram of an embodiment of elements of FIG. 1A and various possible interconnections between these elements.

FIG. 2 also illustrates environment 10. However, in FIG. 2 elements of system 16 and various interconnections in an embodiment arc further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more OracleD databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100$_1$ might be coupled via the network 14 (e.g., the Internet), another application server 100$_{N-1}$ might be coupled via a direct network link, and another application server 100$_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Throughout the remainder of this specification, the word "client" (when used to designate a type of user) is used to refer to clients of the tenants. Although the tenants are also clients of the system 16, the tenants will be referred to as tenants instead of as clients. Until this point the user systems were assumed to belong to tenants of system 16. However, some of the user systems 12 are clients and/or customers of others of those running others of user systems 12. Those of user systems 12 that are clients or customers of other user systems 12 may not be tenants of system 16. In the remainder of this specification most of the references to user systems 12 may refer to user systems that are not run by tenants of system 16 and/or user systems of tenants that are acting in a role similar to their clients.

Client System

Figure 3:
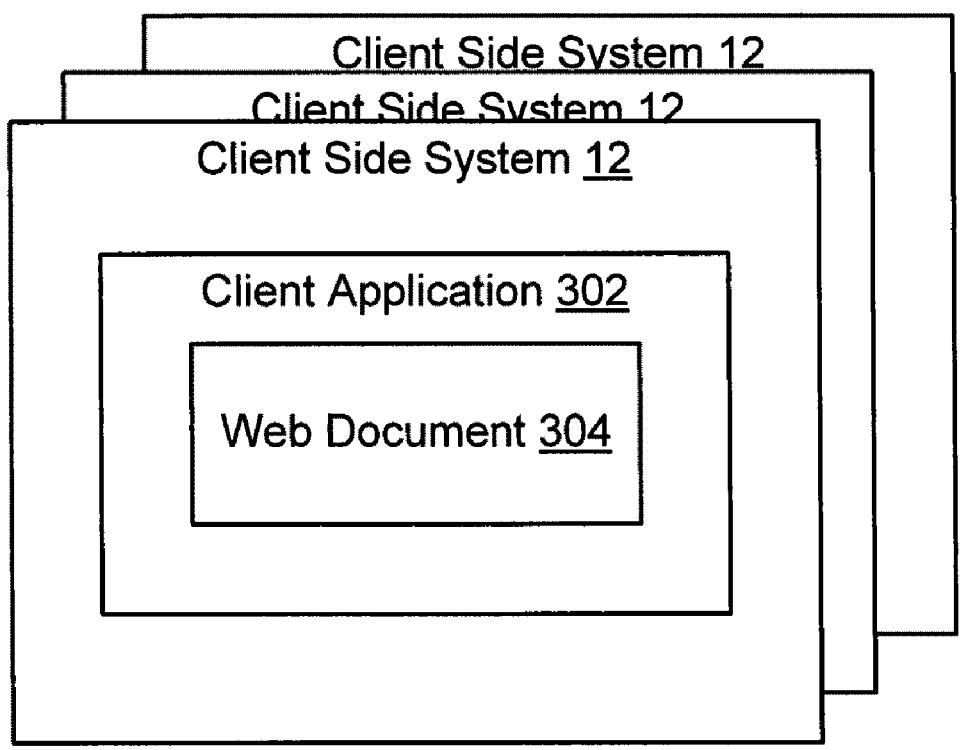
FIG. 3 shows a block diagram of an example of a view of an embodiment of a client of FIGS. 1A, 1B, and 2.

FIG. 3 shows a block diagram of a view of an embodiment of user system 12 (FIGS. 1A, 1B, and 2), which may include client application 302 and client document 304. In other embodiments, client application 302 may not have all of the elements listed and/or may have other elements instead of or in addition to those listed.

Client application 302 is an application for interfacing with a network and for viewing information, such as webpages that are available via a network. An HTTP client is an embodiment of client application 302. Client application 302 is a set of instructions stored on memory system 12B, which are implemented by processor system 12A (FIG. 2). Web document 304 is a document that was received on client application 302, via input system 12C, and is viewed via output system 12D (FIG. 2).

Tenant Websites

Figure 4:
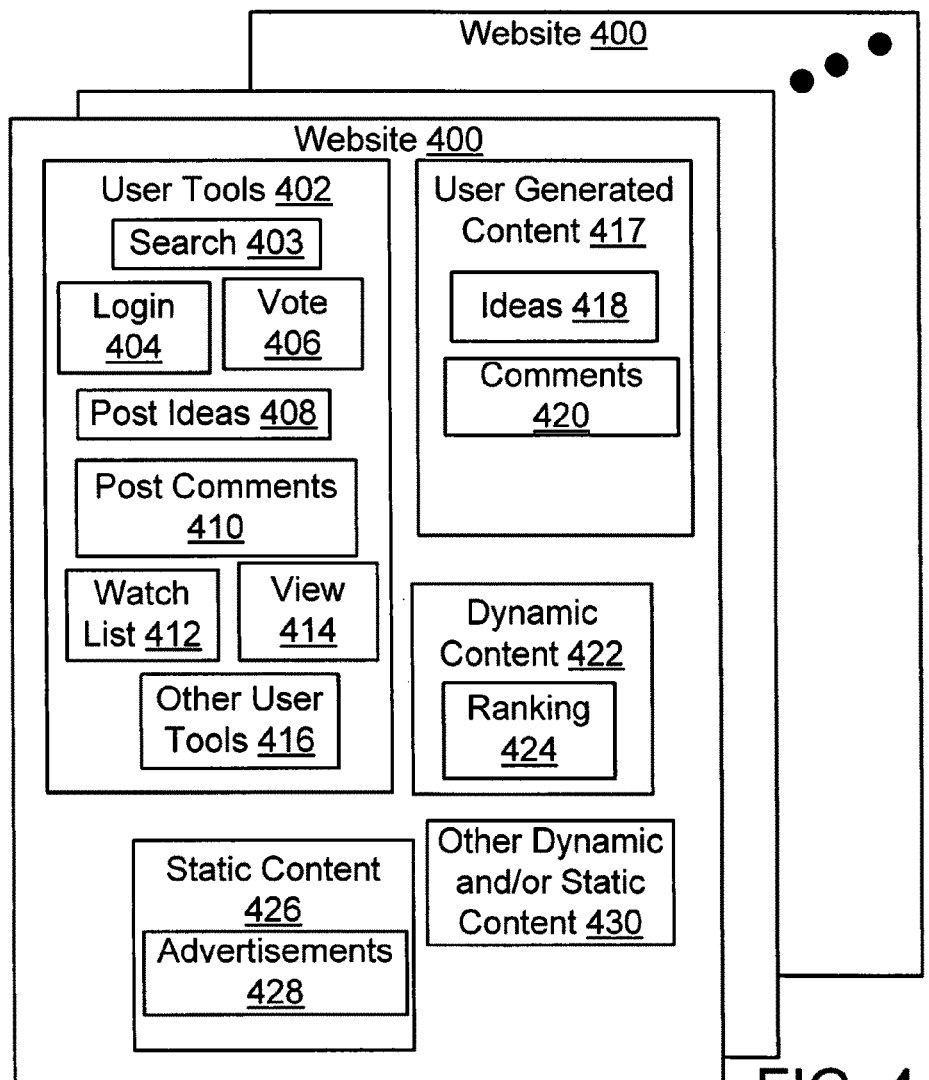
FIG. 4 shows a block diagram of an example of a series of websites associated with the system of FIGS. 1A, 1B, and 2.

FIG. 4 shows a block diagram of an example of a series of websites 400. Websites 400 have user tools 402, which may include search 403, login 404, vote 406, post ideas 408, post comments 410, watch list 412, view 414, and other tools 416. Website 400 may include user generated content 416, which may include ideas 418 and comments 420. Website 400 may include dynamic content 422, which may include ranking 424. Website 400 may include static content 426, which may include advertisements 428. Website 400 may also include other dynamic and/or static content 430. In other embodiments, websites 400 may not have all of the elements listed and/or may have other elements instead of or in addition to those listed.

Website 400 is an embodiment of web document 304 (FIG. 3). Each website 400 belongs to a different tenant. User tools 402 are a set of links that initiate a set of instructions that cause a set of operations to be performed. Search 403 is a field in which the user may enter a search term to find content within website 400. Login 404 is one or more instructions that present a group of fields to the user within which the user enters a password and/or a user name in order to gain entry. The one or more instructions of login 404 cause a processor to decide whether to grant or deny access to the user based on the user's entries, and then either grant or deny access to the user. In an embodiment, some of the tools, such as those that relate to voting, watch lists, posting ideas, and posting comments are only available after logging in, while other tools such as those related to viewing posted ideas, viewing posted comments, and viewing TQMCs are available without logging in.

Vote 406 is one or more set of instructions for a user initiated process for voting on an idea. In an embodiment vote 406 weights each vote according a variety of factors. In an embodiment, vote 406 may weight each vote according to the style of voting. For example, if a particular user tends to only vote infrequently, that user's vote may be given a higher weight on the assumption that the user that votes infrequently only votes on items that the voter feels are important. A vote related to a particular feature from a user that frequently uses that particular feature may be weighted higher than a vote from a user that does not use that particular feature.

In an embodiment, each vote is multiplied by an increasing function of time and then tallied to form the TQMC. After a certain amount of time is passed the votes are all normalized by dividing by a large number, the multiplicative factors (which are used as weighting factors) are all also decreased. For example, all votes received at a first time are multiplied by 1 before summing the new vote with the remaining prior votes. At a later time, all votes received are multiplied by 2. Thus, if 10 votes were received during the first time and 20 more votes were received at the second time, the weighted sum of the votes received at the first time had a value of 10 and the weighted sum of the votes received at the second time had value of 40. Consequently, the total weighted sum of the votes received at both times becomes 40+10=50, which is the TQMC of the idea if no other weights and QMC are included in the TQMC. Continuing with this example, if at a third time the multiplicative factor increases to 4, and only 2 votes are received at the third time, the contribution for the third time is the weighted sum 4×2=8, and after adding the votes from the third time, the weighted sum of the votes is computed as 8+50=58. If after the third time it is time to normalize the votes, and if the vote is normalized by dividing by 10, then after the third time the vote becomes 5.8, and the multiplicative weight may be reduced back to 1 for votes received at a fourth time. The cycle may then be repeated for the times during the next time interval prior to the next normalization at which votes are received. The cycle is then repeated for the fourth, fifth, and sixth time intervals in the same manner as the cycle was performed during the first, second, and third time intervals. Although in this example, a normalization of 10 was used, and votes were received at only three distinct times during the period between normalizations, these values were chosen for simplicity, and the invention is not limited to the specifics of this example. Also, in the above example, no distinction was made between different votes other than the time at which the votes were received and/or sent. However, in an embodiment, different votes may be weighted differently according to other factors in addition to the time at which vote was received or cast.

As an explanation, the longer an idea has been posted the more votes it will tend to accumulate. Thus, the older ideas may have more votes just because the older ideas have been posted longer even though the older idea may in fact be less popular. In order to counteract this phenomenon vote 406 may assign less weight to older votes. The manner of decreasing the value of the vote could be by performing an operation on each vote. For example, consider a case in which a particular user voted on a particular day and after weighting the vote it was given a value of 10. Some time later one may want to decrease the value of that vote by performing an operation such as a square root. However, to perform an operation on each vote every time there is a desire to decrease the weight of the vote is computationally intensive. Instead, the votes for an entire period of time in which the votes of that time period are to have equal weight may be summed and the sum may be multiplied by the weight. Multiplying each new vote by an increasing number has the same effect of decreasing the relative importance of the earlier votes. In other words, multiplying each new vote by an increasing number increases the weight of the new votes and thereby has the same effect of decreasing the relative importance of the earlier votes. Dividing by a large number (or multiplying by a small number) prevents overflow errors. The number used for the normalization is large enough (if dividing or small enough if multiplying) so that no overflow errors are expected to occur prior to the next normalization.

To reiterate in further depth, by using a weighting of the votes that causes the TQMC of the older votes to decay exponentially and optionally by weighting new votes by a time dependent increasing weight allows the application to be scaled with time, which simplifies computing TQMC on multiple sites. By using an exponentially decaying function the contribution that a particular vote or a particular set of votes will have at a later time can be predicted. Specifically, the decay is similar in functional form to radioactive decay, which involves an exponential function the weighted value of the vote is given by $$V_i(t) = Ae^{-(1/\lambda)t},$$

where $t=(t_{now}-t_{time\_of\_vote})$ e can be e (2.71 . . . , which may be referred to as Euler's number or Napier's constant) or any constant C, A is the weight of the vote, $\lambda$ is a decay constant from which the half life can be computed (the half life is a lapse of time when the vote value becomes half the initial value). If e is 2.71 . . . , then the half life of a vote is equal to $\lambda(\ln(2))$. If e equals C, then the half life equals $\lambda(\log_C(2))$, where $\log_C$ is log to the base C. If C is equal to 2 (and e is C), then the half life equals $\lambda$. As an example of how values may be assigned to A, A may be 10 points if the voter is a registered user, and A may be 3 points if the voter is a guest user.

The total value of an article at any time is $$\sum_i V_i(t)$$

where i is equal to a number between 1 to n, where n is the number of votes on the article so far, and t=time right now. Exponentials have a property that at any one time, one only needs to know the current value of the tally of the votes, and then the contribution of the current tally to the full tally can be determined for the rest of the life of the tally. Further, if the contribution of any one vote or of any combination of votes is known at any one time, the contribution of those votes to the tally is known for all future times. In that sense the tally from an exponential decay does not require the storage of individual votes. The details of the tally of past votes do not matter. All that is necessary to store is the current tally of the vote and the rate of decay (the decay constant and the value for e or C).

Regarding computing the TQMC of an idea (e.g., an article describing an idea, anytime it is desired to compute the TQMC of an idea, all that is needed to know is what the TQMC was the last time the TQMC was computed. Based on the last TQMC computed, the time elapsed (e.g., 2 days), and from of the exponential decay, the contribution to the current TQMC can be computed. For example, if the TQMC was 4, if C is 2, and if $\lambda$ is 2 days, then the half life is 2 days. Consequently, if 2 days ago the TQMC was 16, and if no new votes were received in the past 2 days, then the current TQMC will be 8.

By using an exponential decay it is not necessary to record the value of each vote, record when each vote was received or sent, apply a function to the vote to compute the new value, and then sum the results. By using exponentials instead of storing each vote value, only the last value needs to be stored.

An additional property of the exponential decay is that if two ideas are given a particular pair of TQMCs, if no new votes are received, the idea with the higher TQMC will always have the higher TQMC. For example, if a first idea had a TQMC of 100 at a time when a second idea had a TQMC of 90 and if no new votes are received, the first idea will always be ranked higher than the second idea no matter how much time elapses. Consequently, the only time calculations need to be performed is when someone votes on the site. At that time, one can just decay all the TQMCs on all the ideas, update the TQMCs to obtain the new TQMCs for the on the idea that was just voted on. More specifically, a nice feature of an exponential is that even when dealing with an aggregate value (e.g., the TQMC), the exponential ensures that each vote decays the in same manner and contributes the same amount to the aggregate value, even though only the aggregate value (e.g., the TQMC) is computed and stored. Thus, as a result of having each vote decay in the same manner, the exponential makes the vote contribution consistent regardless of when the vote occurs in the lifetime of an idea. Further, as a result of having each vote decay in the same manner, the exponential makes it easy for any user to understand how their vote behaves and how the user's vote contributes to the total TQMC, while allowing the host of the websites 400 to use the aggregate value as a shortcut in computing the decay.

Thus, the exponential saves significant Central Processing Unit (CPU) resources, because there is no need to recalculate the TQMC every time someone loads the page. In order to ensure that two TQMCs for two different ideas have decayed by the same amount it may be desirable to compute the decay for all TQMCs of all ideas when each vote is received. However, it may still be computationally intensive to recalculate the TQMCs of each and every idea every time someone votes on an idea. Consequently, instead of recalculating the new decayed value every time, the value of each new vote may be increased exponentially (instead of decaying the current TQMC exponentially). Consequently, when a new vote is received, the TQMC of only one idea needs to be updated, which is the idea for which the vote was received. In an embodiment, the time dependent weight that is used for multiplying the new vote is a continuous function of time, such as $e^{t/\lambda}$, $2^{t/\lambda}$, or $C^{t/\lambda}$, where here t is the time elapsed since the last normalization, and $$V(t) = \sum_i V_i(t) = \sum_i A_i c^{t_i/\lambda},$$

where C is any positive number, such as e or 2, and $t_i = t_{now} - t_{time\_of\_normlaization}$. In this context, the time is continuous within a predefined tolerance, such as within one second, within one thousandth of a second or within $1 \times 10^{-7}$ of a second.

Post ideas 408 is one or more sets of instructions for a user initiated process for posting an idea. Post comments 410 is one or more sets of instructions for a user initiated process for posting comments about an idea. Watch list 412 is one or more instructions for creating and/or editing a list of ideas that the user would like to track. In an embodiment, the user may receive alerts when a message thread that the user commented on is updated with another comment. The alerts may appear when the user logs on. In an embodiment, if the user is a guest, when the user just visits website 400 the user receives an alert. In an embodiment, a browser-based cookie is sent to the guests system for handling the guest's alerts. The alerts allow the user to remain engaged with other users, since its often hard for a user to remember to go back and read responses to a discussion that the user contributed to. By creating these alerts that appear when the user revisits the site, the user can simply restart or continue a conversation where the user left off. The alert may displayed in a 'New Replies' section of website 400, where new replies may be viewed. View 414 is a set of one or more instructions for viewing ideas and comments about the ideas. Other tools 416 are other tools that may optionally be provided to the user.

User generated content 417 is the content on website 400 that is generated by users. For example, ideas 418 are ideas that were posted by users via post ideas 408 and/or ideas posted by the tenant. Comments 420 are comments posted by the users, such as by post comments 410 (FIG. 4).

Dynamic content 422 is content that changes, and the changes may be based in-part on user input or usage of website 400. Dynamic content 422 may include ranking 424, which ranks the different ideas. When viewing the ideas posted via post ideas 408, as a result of ranking 424 the order in which the ideas appear may be in-part based on, or fully based on, the votes received via vote 406.

Static content 426 contains content that does not change often. An example of static content is advertisements 428. Other static and/or dynamic content 430 contains other static and/or dynamic content, if present. Some examples of other static and/or dynamic content 430 are instructions relating to how to use the user tools 402 or information about how many users have visited the website 400.

Voting on Quality Management Criteria (QMC)

Figure 5:
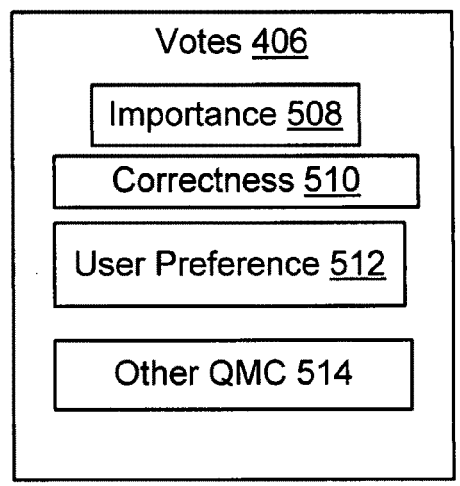
FIG. 5 shows a block diagram of an example of an algorithm for voting on an idea.

FIG. 5 shows a block diagram of an embodiment of the algorithm associated with vote 406 (FIG. 4). Vote 406 may include importance 508, correctness 510, user preference 512, and/or other QMC 514. In other embodiments, vote 406 may not have all of the elements listed and/or may have other elements instead of or in addition to those listed.

There may be a variety of different types of quality management or other criteria for which the user may be given an option to vote when vote 406 (FIGS. 4 and 5) is implemented. Importance 508 may include a set of one or more instructions which when implemented allow a user to indicate whether the user believes the idea is important. Correctness 510, if present, may include a set of one or more instructions which when implemented allow a user to indicate whether the user believes the idea is correct. User preference 512, if present, may include a set of one or more instructions which when implemented allow a user to indicate whether the user believes that the idea is good whether or not the idea as posted is correct or important. Other QMC 514, if present, may include one or more other quality management criteria on which the user is given an opportunity to vote.

Some Viewing Options

Figure 6:
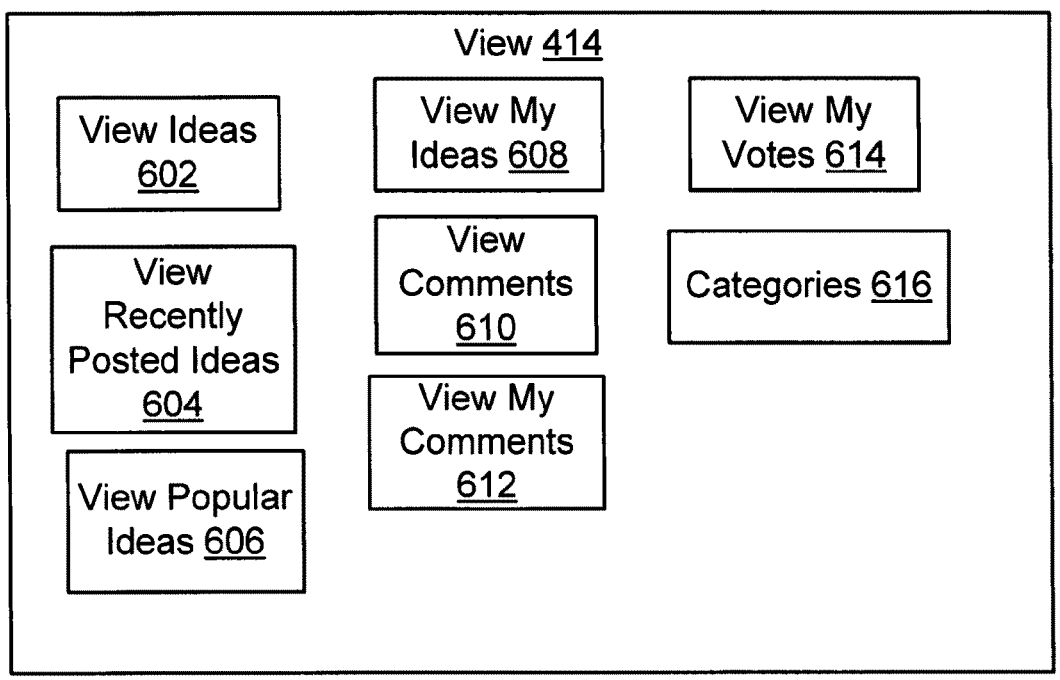
FIG. 6 shows a block diagram of an example of an algorithm of the websites of FIG. 4 for displaying various web pages.

FIG. 6 shows a block diagram of an example of an algorithm associated with view 414 (FIG. 4). View 414 may include view ideas 602, view recently posted ideas 604, view popular ideas 606, view my ideas 608, view comments 610, view my comments 612, view my votes 614, and categories 616. In other embodiments, view 414 may not have all of the elements listed and/or may have other elements instead of or in addition to those listed.

View ideas 602 brings the user to a webpage in which the ideas are listed in the order in which the ideas are ranked. View recently posted ideas 604 brings the user to a webpage in which the ideas are listed that were posted within a predetermined time period of the current date. View popular ideas 606 brings the user to a webpage in which ideas are listed that have a number of votes that is within a certain threshold of the most popular idea. In another embodiment, the user is brought to a page in which a predetermined number of ideas are listed and the ideas listed have the most votes. View my ideas 608 brings the user to a webpage in which the ideas the user posted are shown. View comments 610 brings the user to a webpage in which the comments related the idea currently being viewed are shown. View my comments 612 brings the user to a webpage in which the comments that the user posted are shown. Optionally, the ideas, the votes, and/or other people's comments about that idea are also shown. View my votes 614 brings the user to a webpage in which the ideas that the user voted on as well as the current number of votes received for that idea are shown. Optionally, the ideas and the comments about that idea are also shown. Categories 616 allows the user to select one of a particular group of categories. Once a category is selected, the user is brought to a webpage that shows ideas that relate to the selected category.

Web Server for the Tenant Websites

Figure 7:
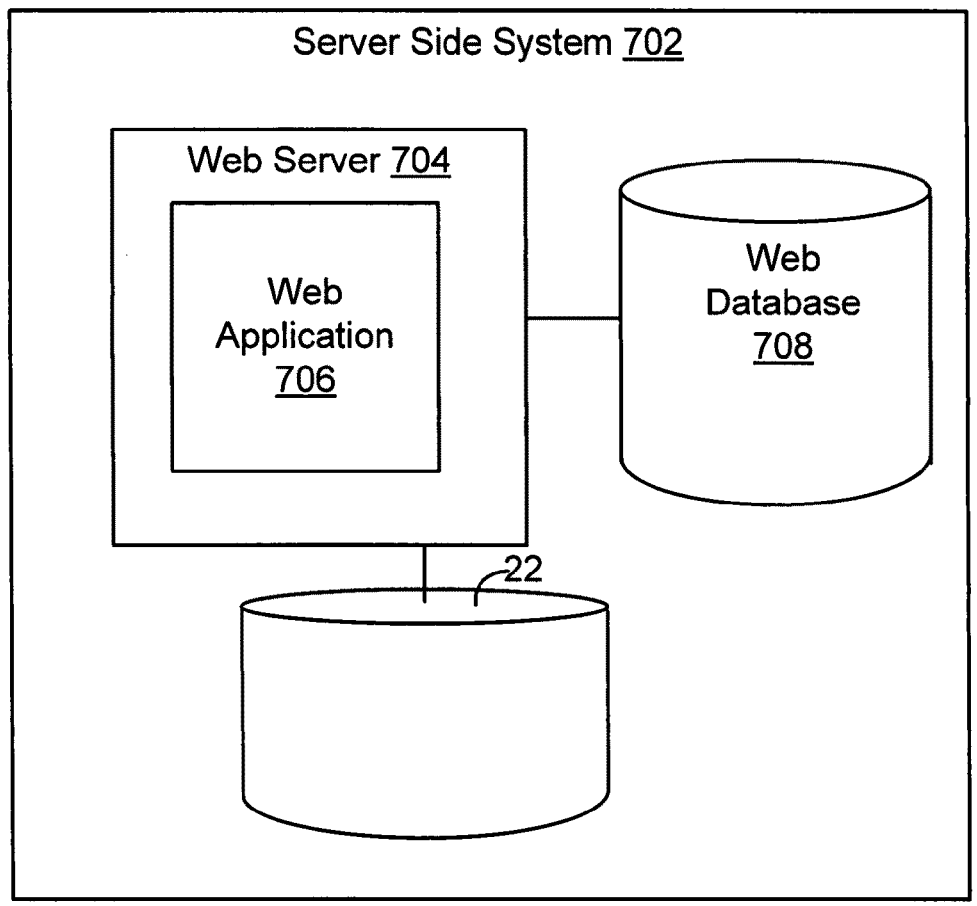
FIG. 7 shows a block diagram of an example of a server side system.

FIG. 7 shows a block diagram of an example of a server side system 702. Server side system 702 may include tenant database 22 (FIGS. 1A, 1B, and 2) and web server 704, which may include web application 706. Server side system 702 also includes web database 708. In other embodiments, server side system 702 may not have all of the elements listed and/or may have other elements instead of or in addition to those listed.

Tenant database 22 was described in conjunction with FIGS. 1A, 1B, and 2. Web server 704 sends web pages of website 400 to user system 12 (FIGS. 1A, 1B, and 2). Web server 704 may be part of network interface 20 (FIG. 1A), an embodiment of web server 29 (FIG. 1B), another part of system 16, or may be communicatively connected to system 16 via network 14 (FIGS. 1A, 1B, and 2). Web server 704 may be an HTTP server or another type web server. Web server 704 may also be communicatively connected to user system 12 via network 14. Web application 706 includes one or more instructions that cause a processor to render a webpage. Rendering a webpage may involve performing computations, such as updating the current value of the vote, and accessing one or more databases for recording and retrieving information. Web database 708 is a database associated with web server 704. As a result of implementing web application 706, web server 704 may access web database 708 to store information received from user system 12. Web server 704, as a result of implementing web application 706, may also retrieve information from web database 708 and/or tenant database 22 that is needed for computations made by web application 706 and/or for rending a web page of website 400 to send to user system 12. Web database 708 may store information necessary for rendering webpages associated with websites 400 (FIG. 4).

Web Application for Tenant Website

Figure 8:
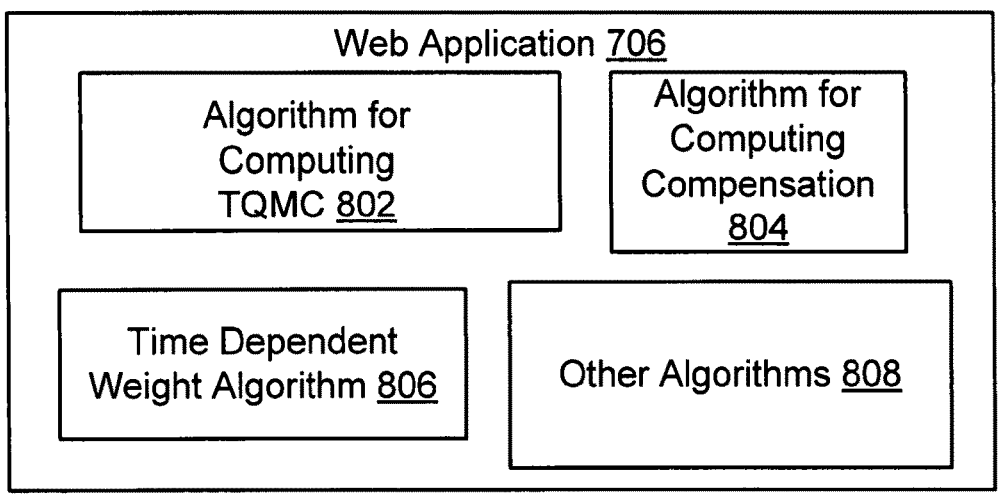
FIG. 8 shows a block diagram of an example of a web application.

FIG. 8 shows a block diagram of an example of web application 706 (FIG. 7). Web application 706 may include algorithm for computing TQMC 802, algorithm for computing compensation 804, an algorithm for computing a time dependent weight 806, and other algorithms that support web documents 808. In other embodiments, web application 706 may not have all of the elements listed and/or may have other elements instead of or in addition to those listed.

Algorithm for computing TQMC 802 may compute the ranking associated with ranking 424, by computing the TQMC. Algorithm for computing TQMC 802 may be based on the same qualitative management criteria that are voted upon by votes 406 (FIG. 4). Other criteria that are not obtained by voting may also be included in the TQMC. Algorithm for computing TQMC 802 may compute one ranking (e.g., a ranking that is not a TQMC) that is seen on website 400 (FIG. 4) and another ranking (e.g., the TQMC) that is used by the tenant associated with website 400. Various factors that may determine the weight of a vote are the time of the vote, style of voting, or site management weightings selected prior to being tallied. For example, votes may be weighted by weights that cause older votes to have less importance than more recent votes. The relative weight of the older votes may be a decaying function of time. In an embodiment, the decaying function of time is accomplished by multiplying the new votes by an increasing function of time. The articles may be displayed to other users in the community in ranked order in which the ranking is based on a value associated with the Total Qualitative Management Criterion.

Algorithm for computing compensation 804 may compute the compensation given as a result of advertisements shown on website 400 (FIG. 4) or as a result of advertisements not being shown on website 400. In one embodiment, advertising based revenues may be earned from advertisers posting advertisements on websites 400. In another embodiment, the tenants may pay a fee for having a website upon which customers and the tenants can post ideas. In another embodiment, advertising revenues may be shared between the sponsoring organizations and the company providing the website.

Time dependent weight algorithm 806 determines the value of the multiplicative weight by which votes are multiplied. Specifically, the difference in time, t, from the current time to the last time the TQMC was normalized is determined, a weight $A_{i+1}$ associated with this vote is determined, a decay constant $\lambda$ and base constant C are retrieved from memory, and the new TQMC is computed as $R(t_{i+1})=A_{i+1}C^{t/\lambda}+R(t_i)$, where $t_{i+1}$ is the current time and $t_i$ is the last time that someone voted for the current idea. After the conclusion of a time period the votes of the entire website are all divided by a large number (or multiplied by a small number), and the multiplicative factor is reduced back to an initial value. Other algorithms 808 include other algorithms used to support website 400 (FIG. 4).

Method of Using the Tenant Websites

Figure 9:
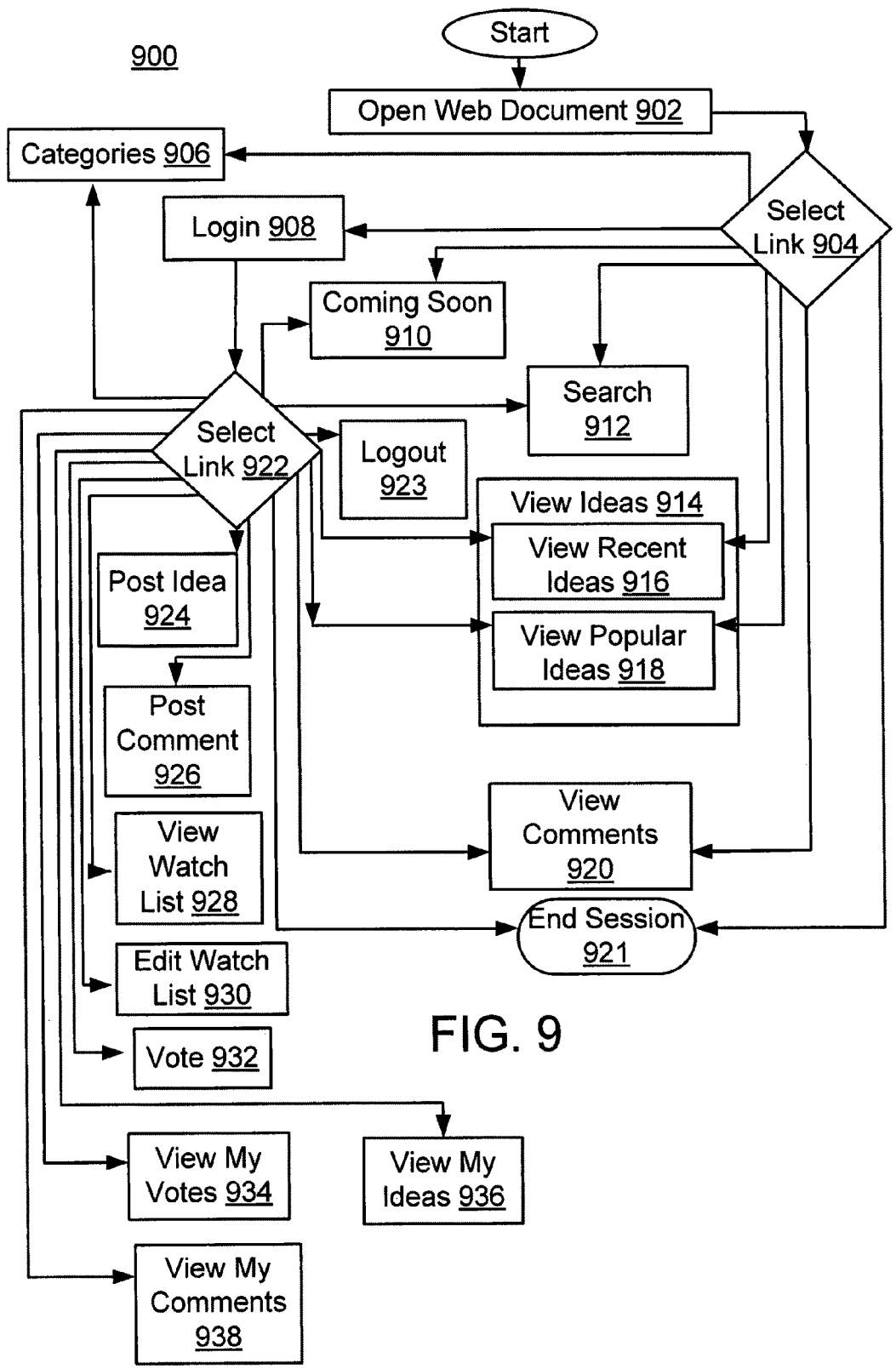
FIG. 9 shows a flowchart of an example of a method of using the websites of FIG. 4.

FIG. 9 is a flowchart of an example of a method 900 of using website 400 (FIG. 4). In step 902, website 400 is opened and presented for viewing on user system 12 (FIGS. 1A, 1B, and 2). In step 904, user system 12 and web server 704 (FIG. 7) wait for a selection selecting the next task to perform. While in step 904 the user may select to start any of a variety of tasks. If the user selects to view a category, method 900 proceeds to step 906. Selecting to view a category may involve the user selecting (e.g., clicking on) one of several categories, which takes the user to step 906, where the user is presented with ideas from the selected category. After step 906 is performed, method 900 is returned to step 904 to allow the user to choose another task. Upon returning to step 904, web document 302 (FIG. 3) may still display the category selected as a result of the completion of step 906. Although no return arrow is illustrated showing a return from step 906 back to step 904, method 900 proceeds from step 906 back to step 904. In general, although no return arrow is illustrated, after selecting a task while in step 904, method 900 performs the selected task and then returns back to step 904. The return arrows are not illustrated because the drawing would become too crowded, and would therefore be difficult to understand. Unless otherwise stated, it can be assumed that a return path exists from the task selected back to step 904.

Returning to step 904, if a selection is entered for logging in, method 900 proceeds to step 908 where user system 12 interacts with the user to receive login information for logging in, and decides whether to grant access to the user. If access is denied, method 900 proceeds from step 908 back to step 904. Below a discussion will follow about what happens if access is granted.

Returning to step 904, while in step 904 the user may select to perform a search by entering a search query into a search field. If the user selects to perform a search, method 900 proceeds to step 912, a search is performed by web server 704, search results are returned to user system 12 (FIGS. 1A, 1B, and 2), and the search results are displayed via client application 302 (FIG. 3) on user system 12.

Returning to step 904, while in step 904 the user may select to view ideas by selecting (e.g., clicking on) a link for viewing ideas. If the user selects to view ideas, method 900 proceeds to step 914, and if not already being displayed on user system 12 (FIGS. 1A, 1B, and 2), a webpage is retrieved via web server 704 (FIG. 7) and displayed on user system 12 showing ideas that were posted in the order in which the ideas are ranked. If this webpage was already being displayed, then which webpage is displayed does not change, and the webpage having the ranked ideas continues to be displayed. Next, method 900 proceeds to step 904 and waits for the next selection.

Similarly, returning to step 904, while in step 904 the user may select to view popular ideas by selecting (e.g., clicking on) a link for viewing recently posted ideas. If the user selects to view popular ideas, method 900 proceeds to step 916. At step 916, if not already being displayed on user system 12 (FIGS. 1A, 1B, and 2), a webpage is retrieved, via web server 704 (FIG. 7), that shows popular ideas that were posted in the order in which the popular ideas are ranked with respect to one another, and then the webpage that was retrieved is displayed. If this webpage was already being displayed, then the webpage that is being displayed does not change, and the webpage having the ranked, recently posted ideas continues to be displayed. Next method 900 proceeds to step 904 and waits for the next selection.

Similarly, returning to step 904, while in step 904 the user may select to view popular ideas by selecting (e.g., clicking on) a link for viewing popular ideas. If the user selects to view popular ideas, method 900 proceeds to step 918, and if not already being displayed on user system 12 (FIGS. 1A, 1B, and 2), a webpage is retrieved via web server 704 (FIG. 7) and displayed on user system 12 showing popular ideas that were posted in the order in which the popular ideas are ranked with respect to one another. If this webpage was already being displayed, then which webpage that is being displayed does not change, and the webpage having the ranked, popular ideas continues to be displayed. Next method 900 proceeds to step 904 and waits for the next selection.

Similarly, returning to step 904, while in step 904 the user may select to view comments related to an idea currently being displayed. If the user selects to view comments, method 900 proceeds to step 920, and if not already being displayed on user system 12 (FIGS. 1A, 1B, and 2), a webpage is retrieved via web server 704 (FIG. 7) and displayed on user system 12 showing comments related to a current idea. If this webpage was already being displayed, then which webpage that is being displayed does not change, and the webpage having the related comments continues to be displayed. Next, method 900 proceeds to step 904 and waits for the next selection.

Returning to step 904, the user may choose to end the session. The session may be ended by closing current webpage of website 400 (FIG. 4). The current webpage may be closed by requesting to view another webpage, such as by selecting a link that downloads another webpage. If the prior webpage viewed was not part of website 400, the back button may cause the downloading of a webpage that is not part of website 400, thereby ending the session and implementing step 921 (after implementing step 921, method 900 does not return to step 904, because method 900 has terminated).

Returning to step 908, if as part of logging in, the user is granted access, method 900 proceeds to step 922. While in step 922, user system 12 and web server 704 (FIG. 7) wait to receive the next selection (similar to step 904). All of the options available while in step 904 are also available while in step 922. Similar to when method 900 is in step 904, if while in step 922 a selection is made to end the session, method 900 proceeds to step 921, method 900 terminates and method 900 does not return to step 904 or 922. Also, if while in step 922, a selection is made to logoff, such as by selecting a link for initiating a logoff process, method 900 proceeds to step 923, where a logout is implemented. In an embodiment, registered users are able to log into website 400. In another embodiment, in addition to registered user being able to login, a user may be granted guest status, and a user with guest status is granted the same level of access as a registered user. Consequently, a user with guest status can access any of the options available after step 923 is implemented In an alternative embodiment, a user with guest status has many but not all of the privileges of a registered user.

After implementing the logout of step 923, method 900 returns to step 904, and the options that are available to be selected are the same as prior to implementing step 908 and logging in. However, if an operation is implemented as a result of making another selection while in step 922, after the operation is complete, method 900 returns to step 922 instead of returning to step 904. Although while in step 922, a selection may be made for implementing steps 906, 910, 912, 914, 916, 918, and 920, these steps were discussed above, and their description is the same (except that when steps 906, 910, 912, 914, 916, 918, and 920 are entered from step 922 the return is to step 922 instead of 904), and therefore steps 906, 910, 912, 914, 916, 918, and 920 are not discussed here.

Returning to step 922, while in step 922 the user may select to post an idea by selecting (e.g., clicking on) a link for posting an idea. If the user selects to post an idea, method 900 proceeds to step 924, where one or more web pages are presented on user system 12 (FIGS. 1A, 1B, and 2) that facilitate entering an idea that will later be displayed on website 400 (FIG. 4) to other users. Next, after posting the idea in step 924, method 900 proceeds to step 922 and waits for the next selection.

Returning to step 922, while in step 922 the user may select to post a comment on an idea currently being displayed by selecting (e.g., clicking on) a link for posting a comment. If the user selects to post a comment, method 900 proceeds to step 926, where one or more web pages are presented on user system 12 (FIGS. 1A, 1B, and 2) that facilitate posting a comment that will later be displayed on website 400 (FIG. 4) to other users. Next, after posting the comment in step 926, method 900 proceeds to step 922 and waits for the next selection.

Returning to step 922, while in step 922 the user may select to view a watch list to see the status of the ideas (which the user has placed in the user's personal watch list) by selecting (e.g., clicking on) a link for viewing the watch list. If the user selects to view the watch list, method 900 proceeds to step 928, where if the watch list web page was not already downloaded and being displayed, the watch list webpage is downloaded to and displayed on user system 12 (FIGS. 1A, 1B, and 2). The watch list webpage may include ideas, the votes associated with those ideas, and/or comments associated with those ideas that the user has placed in the user's watch list. Next, after viewing the watch list in step 928, method 900 proceeds to step 922 and waits for the next selection. The web page having the watch list may still be present on the screen of user system 12 upon returning to step 922.

Returning to step 922, while in step 922 the user may select to edit the watch list by removing or adding ideas to the watch list. If the user selects to view the watch list, method 900 proceeds to step 930, where one or more web pages are presented that facilitate editing the user's watch list. If the user does not have a watch list, a watch list may be created. In an embodiment, every user is given a watch list, but the watch list is empty until an idea is added to the watch list. In an embodiment, the user must first view the watch list via step 928, and from step 928 the user has an option implementing step 930 to edit the watch list. Next, after editing the watch list in step 930, method 900 proceeds to step 922 and waits for the next selection.

Returning to step 922, while in step 922 the user may select to vote on an idea by selecting a link for voting. If the user selects to vote on an idea, method 900 proceeds to step 932, where one or more web pages are presented that facilitate voting on a selected idea. After the user enters a vote, user system 12 (FIGS. 1A, 1B, and 2) sends the vote to web server 704 (FIG. 7). Web server 704 records the new vote, computes a new TQMC based on the new vote, and sends the new TQMC back to user system 12 for display in website 400 (FIG. 4). Next, after voting in step 932, method 900 proceeds to step 922 and waits for the next selection.

Returning to step 922, while in step 922 the user may select to view ideas that the user already voted upon. If the user selects to view the user's vote, method 900 proceeds to step 934, where one or more web pages are presented that show the ideas the that the user voted upon and the current TQMC of that idea. Next, after viewing the ideas voted upon in step 934, method 900 proceeds to step 922 and waits for the next selection.

Returning to step 922, while in step 922 the user may select to view ideas that the user already posted. If the user selects to view the user's posted ideas, method 900 proceeds to step 936, where one or more web pages are presented that show the ideas that the user posted, the current TQMC of that idea, and/or comments that others posted that relate to that idea. Next, after viewing the ideas that the user posted in step 936, method 900 proceeds to step 922 and waits for the next selection.

Returning to step 922, while in step 922 the user may select to view ideas that the user already posted comments about. If the user selects to view the ideas that the user commented upon, method 900 proceeds to step 938, where one or more web pages are presented that show the ideas about which the user posted comments, and the current TQMC of that idea, and/or other comments posted about that idea. Next, after viewing the ideas the user posted comments about in step 938, method 900 proceeds to step 922 and waits for the next selection.

Although in FIG. 9 each steps 906-920, and 924-938 are each depicted as a single unit, each step may have several sub-steps, and after each sub-step, method 900 may return to step 904 or 922 and wait for the user to either select the next sub-step of the step selected, to select another of steps 906-920 and/or steps 924-938, or to select another option. In an embodiment, each of the steps of method 900 is a distinct step. In another embodiment, although depicted as distinct steps in FIG. 9, steps 902-938 may not be distinct steps. For example, for all, or nearly all, of the steps of method 900 there are some sub-steps that are performed by user system 12 and others that are performed by web server 704 of FIG. 7 (as will be discussed in FIGS. 10-12, below). In other embodiments, method 900 may not have all of the above steps and/or may have other steps in addition to or instead of those listed above. The steps of method 900 may be performed in another order. Subsets of the steps listed above as part of method 900 may be used to form their own method.

Client-Side Voting Method

FIG. 10 is a method implemented by user system 12 (FIGS. 1A, 1B, and 2) as part of step 932, which is the algorithm represented by the block vote 406 (FIG. 4). In step 1002, user system 12 receives a selection of a link for increasing the vote associated with an idea. Step 1002 may involve the user inputting the selection into user system 12. In step 1004, user system 12 sends a request to web server 704 to record the new vote and to re-compute the TQMC based on the addition of the new vote to the TQMC. In step 1006, user system 12 receives information for updating the current web page from web server 704 (FIG. 7); so that the updated webpage shows the new TQMC. In step 1008, an updated webpage is rendered by client application and displayed on user system 12. In an embodiment, each of the steps of method 1000 is a distinct step. In another embodiment, although depicted as distinct steps in FIG. 10, steps 1002-1008 may not be distinct steps. In other embodiments, method 1000 may not have all of the above steps and/or may have other steps in addition to or instead of those listed above. The steps of method 1000 may be performed in another order. Subsets of the steps listed above as part of method 1000 may be used to form their own method.

Server-Side Voting Method

FIG. 11 is an example of a method implemented by web sever 704 (FIG. 7) as part of step 932, which is also part of the algorithm represented by the block vote 406 (FIG. 4). In step 1102, web server 704 receives a request for adding a vote to a TQMC associated with an idea. In step 1104, web server 704 computes the new TQMC. Step 1104 may involve determining one or more weighting factors that are multiplied by the vote. The weighting factors may depend on the user placing the vote. For example, votes from customers that bring more revenue may have more weight. Determining the weight may involve computing a time dependent value from web database 708, which is used for a weighting factor. The value retrieved may be a number greater than one, and may be increased to a larger number as the time from the last normalization increases. In step 1106, web server 704 determines and forms the changes that need to be made to the current webpage, and in step 1108 web server 704 sends the changes to user system 12 (FIGS. 1A, 1B, and 2). In an embodiment, each of the steps of method 1100 is a distinct step. In another embodiment, although depicted as distinct steps in FIG. 11, step 1102-1108 may not be distinct steps. In other embodiments, method 1100 may not have all of the above steps and/or may have other steps in addition to or instead of those listed above. The steps of method 1100 may be performed in another order. Subsets of the steps listed above as part of method 1100 may be used to form their own method.

Method of Carrying Out a Single Client-Server Interaction

Figure 12:
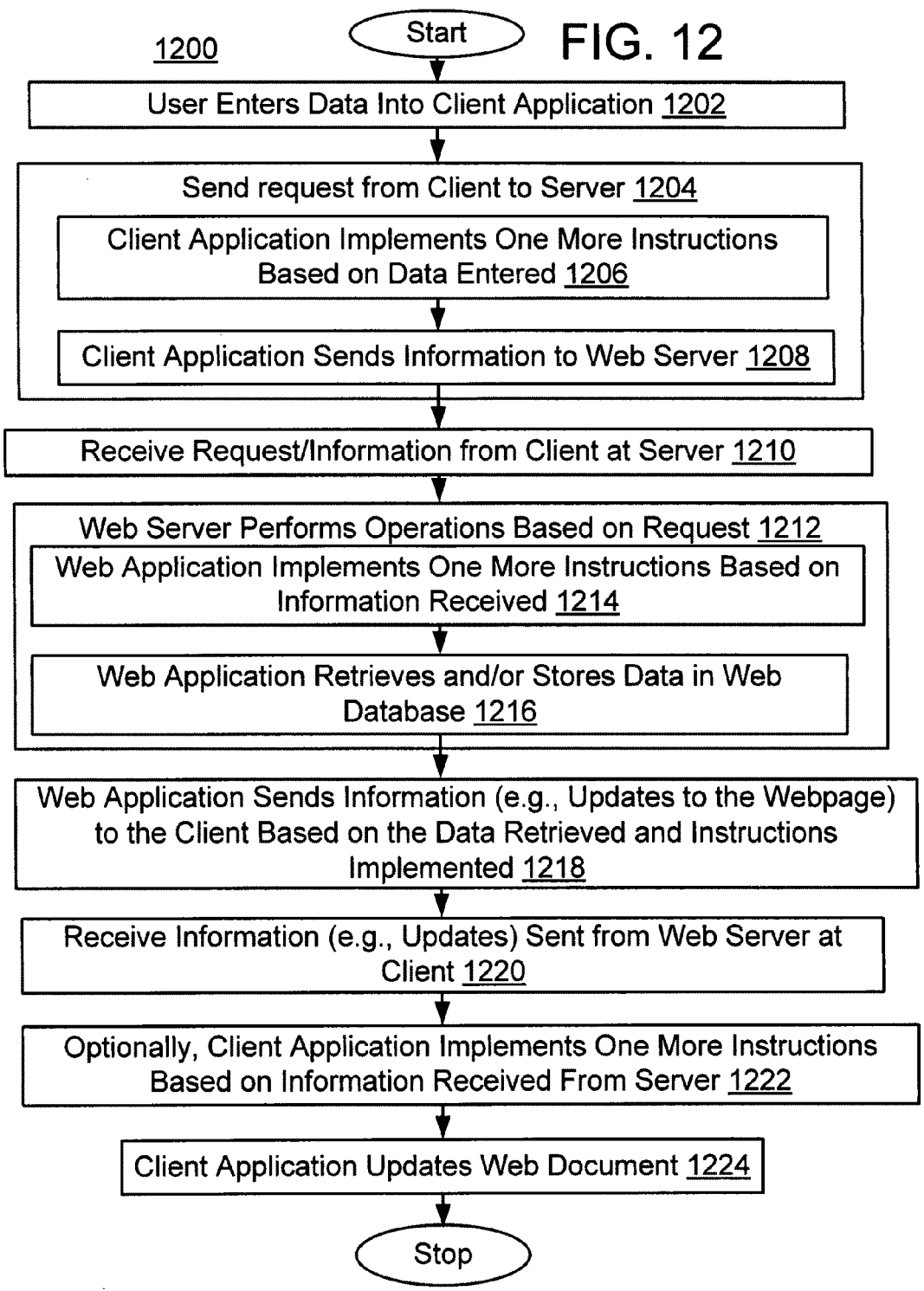
FIG. 12 shows a flowchart of an embodiment of method for a client to interact with a web server.

FIG. 12 shows a flowchart of an embodiment of method 1200 for user system 12 (FIGS. 1A, 1B, and 2) to interact with server side system 702 (FIG. 7) while carrying out methods 900-1100. In step 1202, the user enters data into client application 302 (FIG. 3) based on the content shown in website 400 (FIG. 4). In step 1204, user system 12 sends a request to server 704 for an updated webpage. As an example, step 1204 may involve selecting (e.g., clicking on) a link, such as view recently posted ideas 604 (FIG. 6) or selecting a submit button after entering data into a field, such as the fields of login 404 (FIG. 4). Step 1204 may include two sub-steps, which are steps 1206 and 1208. In step 1206, client application 302 implements one or more instructions based on the information entered by the user. In step 1208, user system 12, via client application 302, sends information to web server 704 (FIG. 7). In step 1210, web server 704 receives the message sent from user system 12.

In step 1212, web server 704 (FIG. 7) performs operations based on the request. Step 1212 may include two sub-steps, step 1214 and 1216. In step 1214, web server 704 performs tasks (e.g., computations) based on the request. In step 1216, web server 704 retrieves data from and/or stores data in web database 708 (FIG. 7) and/or tenant database 22 (FIGS. 1A, 1B, and 2). Steps 1214 and 1216 may be performed prior to during and/or after step 1214, depending on the task being performed. For example, there may be some tasks for which data necessary for performing the task needs to be retrieved prior to performing the task in order to perform the task properly. There may be some sub-tasks that are necessary to perform to produce the data required by a task, and there may be some tasks that need data from web database 708 and/or tenant database 22 as input and produce other data as output that needs to be stored in web database 708 and/or tenant database 22.

In step 1218, based on the operations of step 1212, information, such as updates to webpages of website 400 (FIG. 4) is sent from web server 704 (FIG. 7) to user system 12 (FIGS. 1A, 1B, and 2). In step 1220, the information sent by web server 704 is received at user system 12. In optional step 1222, if performed, one or more instructions are implemented by user system 12 as a result of receiving the information from web server 704. The one or more instructions may involve invoking routines that are part of client application 302 (FIG. 3, e.g., part of the browser) or may involve a call to a function that is stored within user system 12. In step 1224, user system 12 updates web document 302, which is the webpage currently being viewed by the user.

In an embodiment, each of the steps of method 1200 is a distinct step. In another embodiment, although depicted as distinct steps in FIG. 12, step 1202-1224 may not be distinct steps. In other embodiments, method 1200 may not have all of the above steps and/or may have other steps in addition to or instead of those listed above. The steps of method 1200 may be performed in another order. Subsets of the steps listed above as part of method 1200 may be used to form their own method. For example, steps 1202, 1204, 1206, 1220, 1222, and 1224 form a method that is performed on user system 12, while steps 1208-1218 form a method performed by web server 704. The method of steps 1202-1206 and 1220-1224 corresponds to and is more detailed than the method of FIG. 10. However, the method of FIG. 10 is specific to the process of voting, while the method of steps 1202-1206 and 1220-1224 apply to the user system while implementing any of the steps of FIG. 9. Similarly, the method of steps 1208-1218 corresponds to and is more detailed than the method of FIG. 11. However, the method of FIG. 11 is specific to the process of voting, while the method of steps 1208-1218 applies to the user system while implementing any of the steps of FIG. 9.

Method of Computing/Adjusting Rankings

Figure 13:
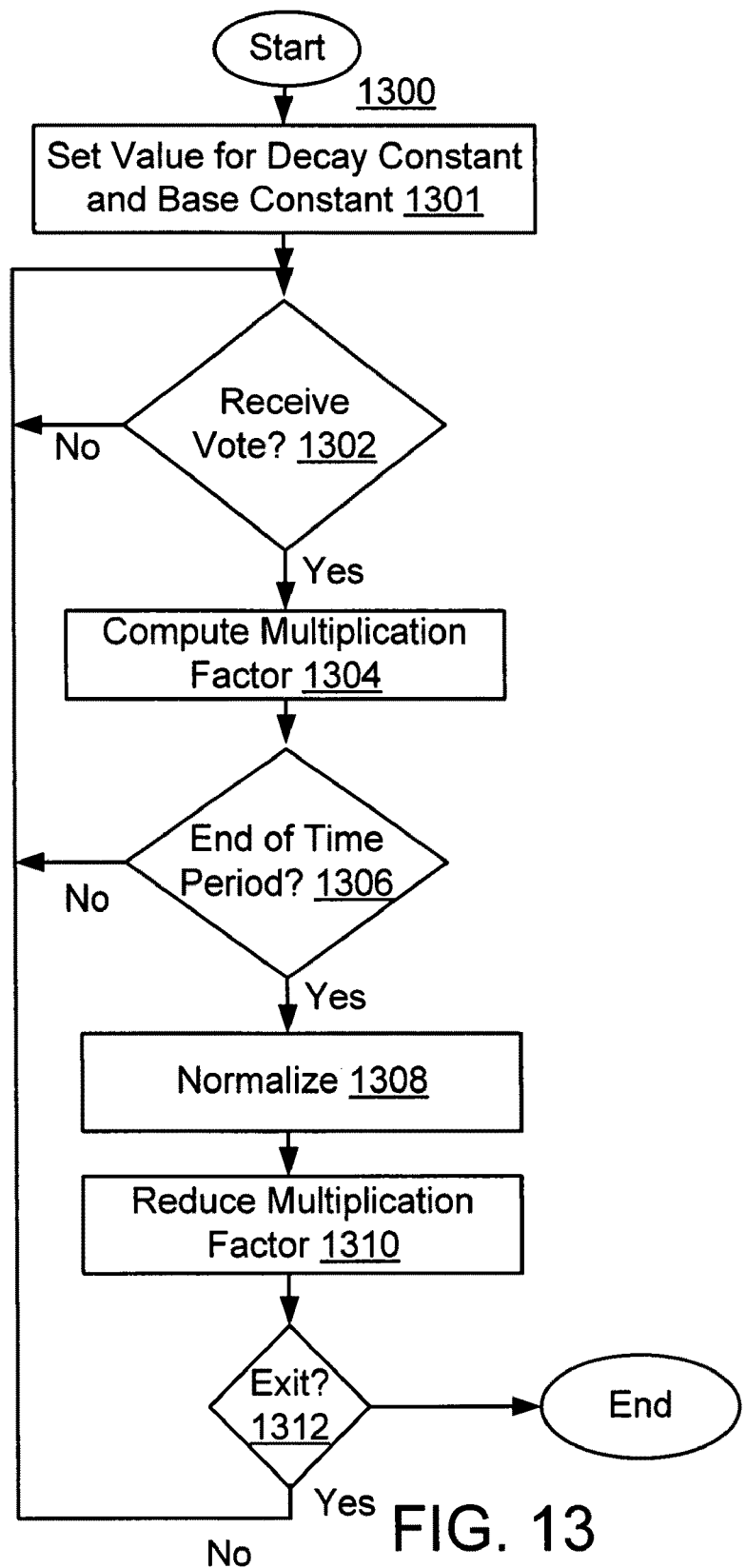
FIG. 13 shows a flowchart of an example of a method, implemented by the web application of FIG. 7, that determines the value of the multiplicative factor by which new votes are multiplied.

FIG. 13 shows a flowchart of an example of a method 1300, implemented by web application 706 (FIG. 7), which determines the value of the multiplicative factor by which new votes are multiplied. Method 1300 may be an embodiment of time dependent weight algorithm 806 (described in FIG. 8). In step 1301, a decay constant, $\lambda$, and a base constant C are set to desired values and stored. In step 1302, a determination is made whether a vote was received. If vote was not received, method 1300 returns and repeats step 1302. If a vote was received, method 1300 proceeds to step 1304 where a multiplicative weight factor is computed based on the time passed from the last normalization, the decay constant, and the base. For example, the multiplicative factor is increased according to an exploding exponential that depends on the time elapsed since the last normalization. In other words, $w(t_{i+1})=A_{i+1}C^{t/\lambda}$, where $A_{i+1}$ is the weighting that depends of factors other than time for the current vote, t is the time from the last normalization $t_N$ until now $t_{i+1}$ ($t=t_{i-1}-t_N$), $\lambda$ is a decay constant related to the half life, and C is a positive constant. Next, the new TQMC is computed $R(t_{i,1})@ w(t_{i,1})$. $R(t_i)@ A_{i,1}C^{t/o}$.R ($t_i$), as explained in conjunction with time dependent weight algorithm 806 of FIG. 8. After step 1304, method 1300 proceeds to step 1306 to determine whether a set time period has passed. If the set time period has not passed, method 1300 returns to step 1302. If the second time period has passed, method 1300 proceeds to step 1308, where all of the votes are divided by a large number (or multiplied by a small number) to normalize the votes and prevent an overflow error. Next, in step 1310, the first multiplicative factor is set to a lower value. For example, the first multiplicative factor may be set to its initial value. After step 1310, method 1300 proceeds to optional step 1312 (if present) where a determination is made whether to end method 1300 (e.g., to repair web server 704). After step 1310 or after step 1312 (if present), method 1300 returns to step 1302.

In an embodiment, each of the steps of method 1300 is a distinct step. In another embodiment, although depicted as distinct steps in FIG. 13, step 1302-1312 may not be distinct steps. In other embodiments, method 1300 may not have all of the above steps and/or may have other steps in addition to or instead of those listed above. The steps of method 1300 may be performed in another order. Subsets of the steps listed above as part of method 1300 may be used to form their own method.

Screen Shot of an Embodiment of the Website

Figure 14:
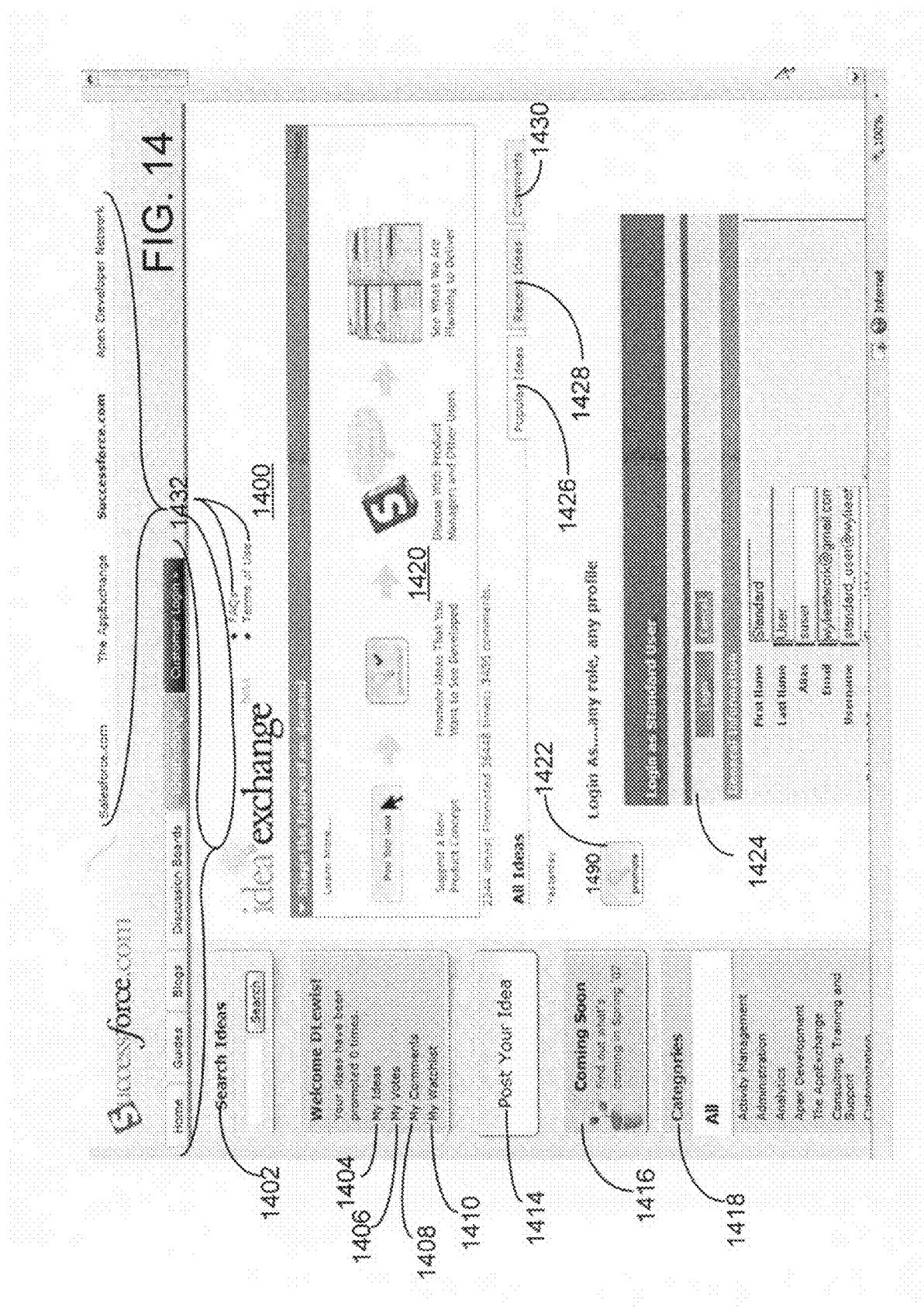
FIG. 14 shows a screenshot 1400 of an embodiment of a webpage form website 400.

FIG. 14 shows a screenshot 1400 of an embodiment of a webpage from website 400 (FIG. 4). Screen shot 1400 includes search 1402, my ideas 1404, my votes 1406, my comments 1408, watch list 1410, post your ideas 1414, coming soon 1416, categories 1418, instructions 1420, vote 1422, idea 1424, popular ideas 1426, recent ideas 1428, comments 1430, and other links 1432. In other embodiments, screen shot 1400 may not have all of the elements listed and/or may have other elements instead of or in addition to those listed.

The links search 1402, my ideas 1404, my votes 1406, my comments 1408, watch list 1410, post your ideas 1414, vote 1422, popular ideas 1426, recent ideas 1428 and comments 1430 of screen shot 1400 cause the implementation of search 403 (FIG. 4) via the search step 912, view my ideas 608 (FIG. 6) via the my ideas step 936, view my votes 614 via the my vote step 934, view my comments 612 via the view my comments step 938, post ideas 408 (FIG. 4) via the post an idea step 924, vote 406 (FIG. 4) via the vote step 932, view popular ideas 606 (FIG. 6) via the popular ideas step 918, view recently posted ideas 604 (FIG. 6) via the recent ideas step 916, view comments 610 (FIG. 6) via the view comment step 920, respectively, which were described above in conjunction with FIGS. 4, 6, and 9. Similarly, the link watch list 1410 of screen shot 1400 causes the implementation of watch list 412 via the view watch list step 928 and the edit watch list step 930, which were described in FIGS. 4 and 9, respectively. The link coming soon 1416 of screen shot 1400 cause the implementation of the coming soon step 910, which is described in FIG. 9. The link categories 1418 of screen shot 1400 cause the implementation of categories 616 via the categories step 906, which were described in FIGS. 6 and 9, respectively.

Instructions 1420 include static information related to how to vote. Idea 1424 is an example of a posted idea. Other links 1432 show some examples of other links that may appear on website 400, such as a link for frequently asked questions, a link for terms of use, and/or links to related websites.

Method for Using the Environment (FIGS. 1A, 1B, and 2)

Figure 15:
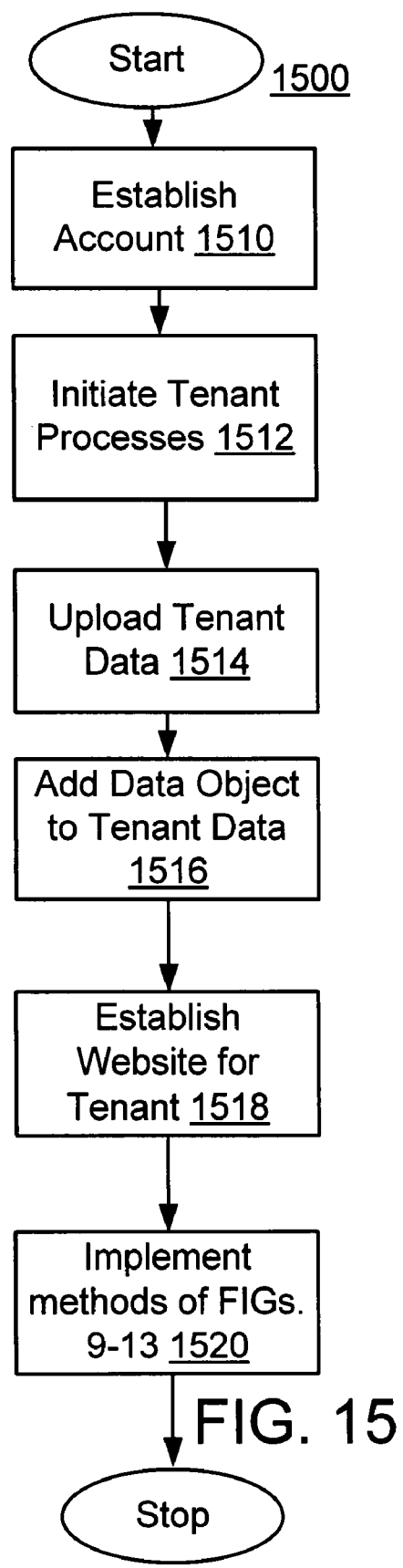
FIG. 15 shows a flowchart of an example of a method of using the environment of FIG. 1A.

FIG. 15 shows a flowchart of an example of a method 1500 of using environment 10. In step 1510, user system 12 (FIGS. 1A, 1B, and 2) establishes an account. In step 1512, one more tenant process space 104 (FIG. 2) are initiated on behalf of user system 12, which may also involve setting aside space in tenant space 112 (FIG. 2) and tenant data 114 (FIG. 2) for user system 12. Step 1512 may also involve modifying application metadata to accommodate user system 12. In step 1514, user system 12 uploads data. In step 1516, one or more data objects are added to tenant data 114 where the data uploaded is stored. In step 1518, a website is established for the new tenant, which may include storing information in web database 708, for creating web pages associated with a website 400 for the tenant. In step 1520 any of the methods of FIGS. 9-13 may be carried out.

Method for Creating the Environment (FIGS. 1A, 1B, and 2)

Figure 16:
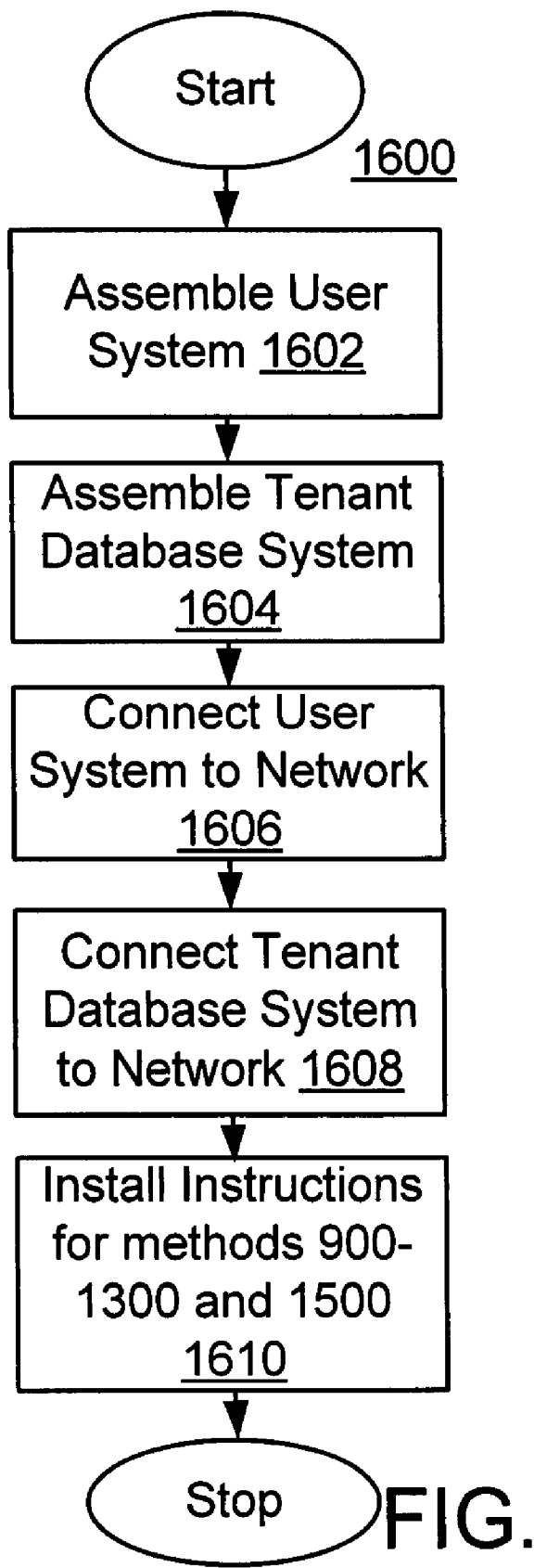
FIG. 16 shows a flowchart of an example of a method of making environment of FIG. 1A.

FIG. 16 is a method of making environment 10, in step 1602, user system 12 (FIGS. 1A, 1B, and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 1604, system 16 (FIGS. 1A, 1B, and 2) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 16 may include installing application platform 18, network interface 20, tenant data storage 22, system data storage 24, system data 25, program code 26, process space 28, UI 30, API 32, PL/SOQL 34, save routine 36, application setup mechanism 38, applications servers $100_1$-$100_N$, system process space 102, tenant process spaces 104, tenant management process space 110, tenant space 112, tenant data 114, and application metadata 116 (FIG. 2).

In step 1606, user system 12 is communicatively coupled to network 104. In step 1608, system 16 is communicatively coupled to network 104 allowing user system 12 and system 16 to communicate with one another (FIG. 2). In step 1610, one or more instructions may be installed in system 16 and/or server side system 702 (FIG. 7, e.g., the instructions may be installed on one or more machine readable media, such as computer readable media, therein) and/or system 16 and/or server side system 702 is otherwise configured for performing the steps of methods 900-1300 (FIGS. 9-13, respectively. For example, as part of step 1610, one or more instructions may be entered into the memory of system 16 and/or server side system 702 for acting as a web server that hosts a website for posting ideas. For example, the one or more instructions for the website may include one or more instructions for clients of the tenants to post ideas, post comments, vote, create a watch list, view a watch list, compute the time dependent weights, and an algorithm for computing the TQMC.

Extensions and Alternatives

In an alternative embodiment, none of the user tools of website 400 (FIG. 4) are available for use without logging in. In yet another embodiment, the tenant may have the option of setting how much of the website is available for use without logging in. In an embodiment, the tenants are given user tools that the clients are not given, such as for setting preferences regarding how to rank ideas, how to weight different types of votes, and preferences regarding the types of advertisers and/or advertisements that are allowed to appear on the website and/or preferences regarding financial arrangements related to the advertisements.

Alternative methods for computing a TQMC may be used instead of the method used above, which may have none, some or all of the properties that of multiplying new votes by an exponentially increasing function of time. For example, the votes are added together over a certain time period (e.g., between $t_1$ and $t_2$). After summing the votes over the period of time, an operation O is performed on the sum forming what will be referred to as an operated sum $$R = O\left(\sum_{t_1}^{t_2} v(t_i)\right),$$

where $v(t_i)$ is the vote at time $t_i$, and O is any operation in which the output is smaller than the input. For example, O could be multiplication by a positive number less than 1, the operation of taking a square root, the operation of taking a log, or any of a number of other operations. Next each new vote during the next time period (e.g., between time $t_2$ and $t_3$) is added to the operated sum. At the end of the second time period the same operation is performed to sum of the first operated sum and the new votes, forming a second operated sum $$R = O\left(\sum_{t_2}^{t_3} v(t_i) + O\left(\sum_{t_1}^{t_2} v(t_i)\right)\right).$$

This process is repeated. After repeating n times, one obtains $$R = \sum_{t_{n-1}}^{t_n} v(t_i) + O\left(\sum_{t_{n-3}}^{t_{n-2}} v(t_i) + O\left(\sum_{t_{n-5}}^{t_{n-4}} v(t_i) + O\left(\sum_{t_{n-7}}^{t_{n-6}} v(t_i) + \ldots\right)\right)\right).$$

By first summing the votes over a time period and then operating on the sum or the sum plus the last operated sum, one can avoid performing operations on individual votes. If this sum tends to increase with time, then every so often a normalization is performed to prevent an overflow error. If O is simply multiplication by a number less than 1 (e.g., ½), then the result is an exponential decay of the weight of the older votes. As long as O is a monotonically increasing function of the TQMC no matter how many times the operation is applied to two TQMCs the order of the rankings is preserved and the higher ranking remains the higher ranking. As long as O is a function that whose output value is smaller than the input value, the older votes will be decreased in significance by a higher percentage compared with the newer value. Some examples of monotonically increasing functions with smaller outputs than the inputs are multiplication by a positive number between 1 and 0, taking a square root of a TQMC, raising a TQMC to a positive fractional power, taking a logarithm to a base greater than 2, or another monotonically increasing function.

Instead of applying the operator O to the prior TQMC, the operator $(O^{-1})^n$ can be applied to the new votes, where $O^{-1}$ is the inverse of O, where n is the number of times the operator $O^{-1}$ is applied, and n is a number that increases with time. Alternatively, as long as $O^{-1}$ is a monotonically increasing function of time that has an output that is greater than the input, whether or not $O^{-1}$ has an inverse, the operator may be applied to new votes $O^{-1}$. For example, $O^{-1}$ may be raising the vote to a power such as 2, and n may be written as αt+k, where α and k and constants, t is the time elapsed from the last normalization $t_N$ to the current time $t_{i+1}$, then a new vote may be given by the value) $V(t_{i+1}) = (A_i^2)^{\alpha t+k} A_i^{2(\alpha t+k)}$. Some examples of monotonically increasing functions are multiplication by a positive number that increases with time, addition of a constant that increases with time, raising a TQMC to a positive power greater than 1 that increases with time, applying n times a logarithm of the to a base greater than 2 (where n is a number that increases with time), or another monotonically increasing function that increases with time.

In an alternative embodiment, instead the weights by which the new votes are multiplied by or the weights by with the prior TQMCs are multiplied by being continuous functions of time, the time may be divided into intervals, and all votes received during the same time interval are given the same weight. For example, the time interval may be one day or one week and any votes received during the same day or week respectively, is given the same weight.

In an embodiment, the manner in which the weighting is increased with time is $w_{i,1} = c^* w_i$ (for example, when i=0, the weight may be $w_0 = c$), where $w_i$ is the multiplicative factor of the $i^{th}$ time interval since the first time period has elapsed, $w_{i+1}$ is the multiplicative factor used for the i+1$^{st}$ passage of the time period, c is the second multiplicative factor that is multiplied by $w_i$ to increase the first multiplicative factor from $w_i$ to $w_{i+1}$. In an embodiment i is an increasing function of time. In an embodiment, the index i is a linear function of time in another embodiment the index i is not a linear function of time. If $w_{i+1} = c^* w_i$, and if the index i is a linear function of time, then the decay in the relative significance of the older votes is exponential. More specifically, if $w_{i-1}=c*w_i$ then $w_{i+k}=(c^k)w_i$ or $w_j=(c^{j-i})w_i$. Consequently, the votes that occurred at a time having weight $w_i$ will have decayed in significance with respect to the votes having the weight $w_j$ by $c^{-(j-1)}$. If the index is a linear function of time then $i=\alpha t_i+$ constant and $j=\alpha t_j+$ constant, and the decay factor has the form of $c^{\alpha d(t_j, t_i)}$.

In yet another embodiment, the tenant is offered a choice of whether to pay a fee for the website and keep the site free of advertisers or whether to allow the advertisers advertise on the website.

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for posting ideas from clients of tenants to a website, the method comprising:
   sending a web page from a host system to a client machine, the web page including at least one of an option for posting an idea, an option for viewing an idea already posted, an option for casting a vote for an idea posted;
   receiving from a client machine, at least one of a new idea for posting, a comment on a previously posted idea and a vote for a previously posted idea; and
   determining, by the host system, a Total Qualitative Management Criterion (TQMC) for each posted idea for each tenant of the web site, by applying an increasing function of time to newer votes to enable relative weightings of older votes to diminish over time without requiring computing a decaying time function to determine weightings for each vote.

2. The method of claim 1, wherein applying an increasing function of time to newer votes to enable relative weightings of older votes to diminish over time without requiring computing a decaying time function to determine weightings for each vote includes:
   applying a monotonically increasing function of time to each vote to obtain a plurality of Qualitative Management Criteria (QMC) for each idea;
   summing the QMCs for each idea to determine the TQMC; and
   providing the TQMC as an indication of votes for a posted idea associated with the TQMC, each vote of the TQMC having a value decaying with age of the vote.

3. The method of claim 2, at least one of the plurality of QMC being an accuracy associated with the idea.

4. The method of claim 2, at least one of the plurality of QMC being an importance associated with the idea.

5. The method of claim 1, the webpage including at least the option for viewing an idea, and the option for viewing an idea includes an option for viewing a collection of recently posted ideas, which are a subset of a set of viewable ideas, the subset has fewer ideas than the set of viewable ideas, the ideas of the set that are in the subset are more recent than ideas that are in the set but not in the subset.

6. The method of claim 1, the webpage including at least the option for viewing a collection of popular ideas, and the option for viewing a collection of popular ideas includes an option for viewing a collection of popular posted ideas, which are a subset of a set of viewable ideas, the subset has fewer ideas than the set of viewable ideas, the ideas in the set and in the subset are more popular than ideas that are in the set but not in the subset.

7. The method of claim 1, further comprising:
   receiving a vote for an idea from a client machine;
   the applying includes multiplying the vote received by a weighting factor that is an increasing function of time to form a weighted vote;
   adding the weighted vote to a number representing the TQMC of the idea to form an updated TQMC; and
   sending the updated TQMC to the client.

8. The method of claim 7, further comprising:
   the weighting factor being dependent on a difference in time, which is a time at which the vote was received minus a time at which a most recent normalization was performed.

9. The method of claim 7, further comprising:
   after a set period of time, dividing all TQMCs associated with a website associated with the tenant by a number that is large enough so that it is unlikely that an overflow error will occur prior to an end of a next period of time having a duration that is as long as the set period.

10. The method of claim 7, the weighting factor being a product of at least two weighting factors including at least a weighting factor that is dependent on time and a weighting factor that is associated with the client.

11. The method of claim 10, the weighting factor that is associated with the client being dependent on a voting pattern associated with the client.

12. The method of claim 10, the weighting factor that is associated with the client being dependent on whether the client is registered with one of the tenants.

13. The method of claim 7, the weighting factor being an exponentially increasing function of time.

14. The method of claim 1, further comprising:
   sending advertisements to the client; and
   computing revenues to send to one of the tenants based on the advertisements.

15. The method of claim 1, further comprising:
   sending advertisements to the client; and
   adjusting revenues that one of the tenants is requested to send to a host of the website based on the advertisements.

16. The method of claim 1, further comprising:
   sending advertisements to clients of the plurality of tenants;
   computing revenues exchanged between the host of the website and the plurality of tenants based on the advertisements;
   receiving, from a client machine, a vote for an idea; the method also includes
   sending the TQMC to the client for display on the webpage;
   after a set period of time dividing all TQMCs associated with a website associated with the tenant by a number that is large enough so that an overflow error is unlikely to occur prior to an end of a next period of time having a duration that is as long as the set period;
   the applying of the increasing function of time to the newer votes to enable the relative weightings of the older votes to diminish over time without requiring the computing of the decaying time function to determine the weightings for each vote includes at least:

applying a monotonically increasing function of time to each vote to obtain a plurality of Qualitative Management Criteria (QMC) for each idea;

for at least one of the QMC, which is associated with the vote, the applying includes multiplying the vote received by a weighting factor that is an increasing function of time to form a weighted vote;

adding the weighted vote to a number representing the QMC of the idea to form an updated QMC;

summing the QMCs for each idea to determine the TQMC; and providing the TQMC as an indication of votes for a posted idea associated with the TQMC;

the method also includes sending the TQMC to the client for display on the webpage; and after a set period of time dividing all TQMC associated with a website associated with the tenant by a number that is expected to be large enough to prevent an overflow error from occurring prior to an end of a next period of time having a duration that is as long as the set period;

at least one of the plurality of QMC being an accuracy associated with the idea;

at least one of the plurality of QMC being an importance associated with the idea;

the webpage including at least the option for viewing an idea, and the option for viewing an idea includes an option for viewing a collection of recently posted ideas, which are a subset of a set of viewable ideas, the subset has fewer ideas than the set of viewable ideas, the ideas of the set that are in the subset are more recent than ideas that are in the set but not in the subset;

at least the option for viewing a collection of popular ideas, and the option for viewing a collection of popular ideas includes an option for viewing a collection of popular posted ideas, which are a subset of a set of viewable ideas, the subset has fewer ideas than the set of viewable ideas, the ideas in the set and in the subset are more popular than ideas that are in the set but not in the subset;

the weighting factor being a product of at least three weighting factors including at least a weighting factor that is dependent on time and at least two weighting factors that are associated with the client, the weighting factor that is dependent on time being an exponential function dependent on a difference in time, which is a time at which the vote was received minus a time at which a most recent normalization was performed;

at least one of the weighting factors that is associated with the client being dependent on a voting pattern associated with the client; and at least one of the weighting factors that is associated with the client being dependent on whether the client is registered with one of the tenants.

17. A machine-readable medium carrying one or more sequences of instructions for implementing a method for providing an interface for object relationships, the method comprising:

sending, from a host system, a web page to a client, the web page including at least one of an option for posting an idea, an option for viewing an idea already posted, an option for casting a vote for an idea posted;

receiving, from a client machine, at least one of a new idea for posting, a comment on a previously posted idea and a vote for a previously posted idea; and determining, by the host system, a Total Qualitative Management Criterion (TQMC) for each posted idea for each tenant of the website, by applying an increasing function of time to newer votes to enable relative weightings of older votes to diminish over time without requiring computing a decaying time function to determine weightings for each vote.

18. The machine-readable medium of claim 17, wherein applying an increasing function of time to newer votes to enable relative weightings of older votes to diminish over time without requiring computing a decaying time function to determine weightings for each vote includes:

applying a monotonically increasing function of time to each vote to obtain a plurality of Qualitative Management Criteria (QMC) for each idea;

summing the QMCs for each idea to determine the TQMC; and providing the TQMC as an indication of votes for a posted idea associated with the TQMC, each vote of the TQMC having a value decaying with age of the vote.

19. The machine-readable medium of claim 18, at least one of the plurality of QMC being an accuracy associated with the idea.

20. The machine-readable medium of claim 18, at least one of the plurality of QMC being an importance associated with the idea.

21. The machine-readable medium of claim 17, the webpage including at least the option for viewing an idea, and the option for viewing an idea includes an option for viewing a collection of recently posted ideas, which are a subset of a set of viewable ideas, the subset has fewer ideas than the set of viewable ideas, the ideas of the set that are in the subset are more recent than ideas that are in the set but not in the subset.

22. The machine-readable medium of claim 17, the webpage including at least the option for viewing a collection of popular ideas, and the option for viewing a collection of popular ideas includes an option for viewing a collection of popular posted ideas, which are a subset of a set of viewable ideas, the subset has fewer ideas than the set of viewable ideas, the ideas the set and in the subset are more popular than ideas that are in the set but not in the subset.

23. The machine-readable medium of claim 17, the method further comprising:

receiving, from a client machine, a vote for an idea;

the applying includes multiplying the vote received by a weighting factor that is an increasing function of time to form a weighted vote;

adding the weighted vote to a number representing the TQMC of the idea to form an updated TQMC; and sending the updated TQMC to the client.

24. The machine-readable medium of claim 23, the method further comprising:

the weighting factor being dependent on a difference in time, which is a time at which the vote was received minus a time at which a most recent normalization was performed.

25. The machine-readable medium of claim 23, the method further comprising:

after a set period of time dividing all TQMCs associated with a website associated with the tenant by a number that is expected to be large enough to prevent an overflow error from occurring prior to an end of a next period of time having a duration that is as long as the set period.

26. The machine-readable medium of claim 23, the weighting factor being a product of at least two weighting factors including at least a weighting factor that is dependent on time and a weighting factor that is associated with the client.

27. The machine-readable medium of claim 26, the weighting factor that is associated with the client being dependent on a voting pattern associated with the client.

28. The machine-readable medium of claim 26, the weighting factor that is associated with the client being dependent on whether the client is registered with one of the tenants.

29. The machine-readable medium of claim 23, the weighting factor being an exponentially increasing function of time.

30. The machine-readable medium of claim 17, the method further comprising:
sending advertisements to the client machine; and
computing revenues to send to one of the tenants based on the advertisements.

31. The machine-readable medium of claim 17, the method further comprising:
sending advertisements to the client machine; and
adjusting revenues that one of the tenants is requested to send to a host of the website based on the advertisements.

32. The machine readable medium of claim 17, the method further comprising:
sending advertisements to clients of the plurality of tenants;
computing revenues exchanged between the host of the website and the plurality of tenants based on the advertisements;
receiving a vote for an idea; the method also includes
sending the TQMC to the client machine for display on the webpage;
after a set period of time dividing all TQMC associated with a website associated with the tenant by a number that is expected to be large enough to prevent an overflow error from occurring prior to an end of a next period of time having a duration that is as long as the set period;
wherein applying an increasing function of time to newer votes to enable relative weightings of older votes to diminish over time without requiring computing a decaying time function to determine weightings for each vote includes:
applying a monotonically increasing function of time to each vote to obtain a plurality of Qualitative Management Criteria (QMC) for each idea;
for at least one of the QMC, which is associated with the vote, the applying includes
multiplying the vote received by a weighting factor that is an increasing function of time to form a weighted vote
adding the weighted vote to a number representing the QMC of the idea to form an updated QMC;
summing the QMCs for each idea to determine the TQMC; and
providing the TQMC in place of a summation of votes, each vote of the TQMC having a value decaying with age of the vote;
the method also includes
sending the TQMC to the client for display on the webpage; and
after a set period of time dividing all TQMC associated with a website associated with the tenant by a number that is expected to be large enough to prevent an overflow error from occurring prior to an end of a next period of time having a duration that is as long as the set period;
at least one of the plurality of QMC being an accuracy associated with the idea;
at least one of the plurality of QMC being an importance associated with the idea;
the webpage including
at least the option for viewing an idea, and the option for viewing an idea includes an option for viewing a collection of recently posted ideas, which are a subset of a set of viewable ideas, the subset has fewer ideas than the set of viewable ideas, the ideas of the set that are in the subset are more recent than ideas that are in the set but not in the subset;
at least the option for viewing a collection of popular ideas, and the option for viewing a collection of popular ideas includes an option for viewing a collection of popular posted ideas, which are a subset of a set of viewable ideas, the subset has fewer ideas than the set of viewable ideas, the ideas in the set and in the subset are more popular than ideas that are in the set but not in the subset;
the weighting factor being a product of at least three weighting factors including at least a weighting factor that is dependent on time and at least two weighting factors that are associated with the client, the weighting factor that is dependent on time being an exponential function dependent on a difference in time, which is a time at which the vote was received minus a time at which a most recent normalization was performed;
at least one of the weighting factors that is associated with the client being dependent on a voting pattern associated with the client; and
at least one of the weighting factors that is associated with the client being dependent on whether the client is registered with one of the tenants.

33. A system for posting ideas from clients of a system to a website, the system comprising:
a host system having
a processor system,
volatile memory, and
non-volatile memory;
the non-volatile memory including at least one machine readable medium carrying one or more sequences of instructions for which when implemented causes the processor system to implement a method comprising:
sending a web page from the host system to a client machine, the web page including at least one of an option for posting an idea, an option for viewing an idea already posted, an option for casting a vote for an idea posted;
receiving from a client machine, at least one of a new idea for posting, a comment on a previously posted idea and a vote for a previously posted idea; and
determining, by the host system, a Total Qualitative Management Criterion (TQMC) for each posted idea for each tenant of the website, by applying an increasing function of time to newer votes to enable relative weightings of older votes to diminish over time without requiring computing a decaying time function to determine weightings for each vote;
the processor system implementing the method stored on the machine readable medium.

34. The system of claim 33, wherein the processor system applies a monotonically increasing function of time to each vote to obtain a plurality of Qualitative Management Criteria (QMC) for each idea;
sums the QMCs for each idea to determine the TQMC; and
provides the TQMC as an indication of votes for a posted idea associated with the vote.

35. The system of claim 34, at least one of a plurality of QMCs being an accuracy associated with an idea.

36. The system of claim 34, at least one of a plurality of QMCs being an importance associated with an idea.

37. The system of claim 33, the webpage includes at least the option for viewing an idea, and the option for viewing an idea includes an option for viewing a collection of recently posted ideas, which are a subset of a set of viewable ideas, the subset has fewer ideas than the set of viewable ideas, the ideas of the set that are in the subset are more recent than ideas that are in the set but not in the subset.

38. The system of claim 33, the webpage includes at least the option for viewing, a collection of popular ideas, and the option for viewing a collection of popular ideas includes an option for viewing a collection of popular posted ideas, which are a subset of a set of viewable ideas, the subset has fewer ideas than the set of viewable ideas, the ideas in the set and in the subset are more popular than ideas that are in the set but not in the subset.

39. The system of claim 33, the method further comprising:
receiving, from a client machine, a vote for an idea;
the applying includes multiplying the vote received by a weighting factor that is an increasing function of time to form a weighted vote;
adding the weighted vote to a number representing the TQMC of the idea to form an updated TQMC; and
sending the updated TQMC to the client.

40. The system of claim 39, the method further comprises:
the weighting factor being dependent on a difference in time, which is a time at which the vote was received, by the host system, minus a time at which a most recent normalization was performed by the processor system.

41. The system of claim 39, the method further comprising:
after a set period of time dividing all TQMCs associated with a website associated with the tenant by a number that is expected to be large enough to prevent an overflow error from occurring prior to an end of a next period of time having a duration that is as long as the set period.

42. The system of claim 39, the weighting factor being a product of at least two weighting factors including at least a weighting factor that is dependent on time and a weighting factor that is associated with the client.

43. The system of claim 42, the weighting factor that is associated with the client being dependent on a voting pattern associated with the client.

44. The system of claim 42, the weighting factor that is associated with the client being dependent on whether the client is registered with one of the tenants.

45. The system of claim 39, the weighting factor being an exponentially increasing function of time.

46. The system of claim 33, the method further comprising:
sending advertisements to the client machine; and
computing revenues to send to one of the tenants based on the advertisements.

47. The system of claim 33, the method further comprising:
sending advertisements to the client machine; and
adjusting revenues that one of the tenants is requested to send to a machine of a host of the website based on the advertisements.

48. The system of claim 33, the method further comprising:
sending advertisements to clients of the plurality of tenants;
computing revenues exchanged between the host of the website and the plurality of tenants based on the advertisements;
receiving, from a client machine, a vote for an idea; the method also includes sending the TQMC to the client machine for display on the webpage;
after a set period of time dividing all TQMCs associated with a website associated with the tenant by a number that is expected to be large enough to prevent an overflow error from occurring prior to an end of a next period of time having a duration that is as long as the set period;
the applying of the increasing function of time to the newer votes to enable the relative weightings of the older votes to diminish over time without requiring the computing the decaying time function to determine the weightings for each vote includes at least:
applying a monotonically increasing function of time to each vote to obtain a plurality of Qualitative Management Criteria (QMC) for each idea;
for at least one of the QMC, which is associated with the vote, the applying includes
multiplying the vote received by a weighting factor that is an increasing function of time to form a weighted vote;
adding the weighted vote to a number representing the QMC of the idea to form an updated QMC;
summing the QMCs for each idea to determine the TQMC; and
providing the TQMC in place of a summation of votes, each vote of the TQMC having a value decaying with age of the vote;
the method also includes
sending the TQMC to the client machine for display on the webpage; and
after a set period of time dividing all TQMC associated with a website associated with the tenant by a number that is expected to be large enough to prevent an overflow error from occurring prior to an end of a next period of time having a duration that is as long as the set period;
at least one of the plurality of QMC being an accuracy associated with the idea;
at least one of the plurality of QMC being an importance associated with the idea;
the webpage including
at least the option for viewing an idea and the option for viewing an idea includes an option for viewing a collection of recently posted ideas, which are a subset of a set of viewable ideas, the subset has fewer ideas than the set of viewable ideas, the ideas of the set that are in the subset are more recent than ideas that are in the set but not in the subset;
at least the option for viewing a collection of popular ideas, and the option for viewing a collection of popular ideas includes an option for viewing a collection of popular posted ideas, which are a subset of a set of viewable ideas, the subset has fewer ideas than the set of viewable ideas, the ideas in the set and in the subset are more popular than ideas that are in the set but not in the subset;
the weighting factor being a product of at least three weighting factors including at least a weighting factor that is dependent on time and at least two weighting factors that are associated with the client, the weighting factor that is dependent on time being an exponential function dependent on a difference in time, which is a time at which the vote was received minus a time at which a most recent normalization was performed;

at least one of the weighting factors that is associated with the client being dependent on a voting pattern associated with the client; and at least one of the weighting factors that is associated with the client being dependent on whether the client is registered with one of the tenants.

49. The method of claim 1, the host system including at least a database system.

50. A method for posting ideas from clients of tenants to a website, the method comprising:

sending one or more web pages from a host system to a client machine, the one or more web pages including at least one posted idea and
 a current value for a Total Qualitative Management Criterion (TQMC), the TQMC representing a popularity of the posted idea, the current value of the TQMC being computed by weighting a plurality of previously received votes that are weighted according to an increasing function of time;
 an option to post a new idea, and
 an option to vote on the posted idea;

receiving from the client machine, at least one new vote for a previously posted idea; and determining, by the host system, a new value for the TQMC, by determining a weighting for the new vote according to the increasing function of time, such that the new vote is weighted greater than any of the plurality of previously received votes in the current value of the TQMC, and combining the new vote, weighted according to the weighting for the new vote, with the current value of the TQMC to arrive at the new value of the TQMC.

51. A machine-readable medium carrying one or more sequences of instructions for implementing a method for providing an interface for object relationships, the method comprising:

sending, from a host system, a web page to a client, the web page including at least one posted idea and
 a current value for a Total Qualitative Management Criterion (TQMC), the TQMC representing a popularity of the posted idea, the current value of the TQMC being computed by weighting a plurality of previously received votes that are weighted according to an increasing function of time;
 an option to post a new idea, and
 an option to vote on the posted idea;

receiving from the client machine, at least one new vote for a previously posted idea; and determining, by the host system, a new value for the TQMC, by determining a weighting for the new vote according to the increasing function of time, such that the new vote is weighted greater than any of the plurality of previously received votes in the current value of the TQMC, and combining the new vote, weighted according to the weighting for the new vote, with the current value of the TQMC to arrive at the new value of the TQMC.

52. A system for posting ideas from clients of a system to a website, the system comprising:

a host system having a processor system, volatile memory, and non-volatile memory;

the non-volatile memory including at least one machine readable medium carrying one or more sequences of instructions for which when implemented causes the processor system to implement a method comprising:

sending one or more web pages from a host system to a client machine, the one or more web pages including at least one posted idea and
 a current value for a Total Qualitative Management Criterion (TQMC), the TQMC representing a popularity of the posted idea, the current value of the TQMC being computed by weighting a plurality of previously received votes that are weighted according to an increasing function of time;
 an option to post a new idea, and
 an option to vote on the posted idea;

receiving from the client machine, at least one new vote for a previously posted idea; and determining, by the host system, a new value for the TQMC, by determining a weighting for the new vote according to the increasing function of time, such that the new vote is weighted greater than any of the plurality of previously received votes in the current value of the TQMC, and combining the new vote, weighted according to the weighting for the new vote, with the current value of the TQMC to arrive at the new value of the TQMC.

53. A method for rating posted ideas on a website, the method comprising:

sending a web page from a host system to a plurality client machines, the web page including at least a posted idea and a control for casting a vote for said posted idea;

receiving from at least one of said plurality of client machines, a vote for the posted idea, wherein said vote is input via the control for casting the vote; and determining, by the host system, a Total Qualitative Management Criterion (TQMC) for the posted idea by weighting each vote based on when a vote is received, wherein a newer vote is weighted more than an older vote.

54. A machine-readable medium carrying one or more sequences of instructions for implementing a method for rating posted ideas on a website, the method comprising:

sending a web page from a host system to a plurality client machines, the web page including at least a posted idea and a control for casting a vote for said posted idea;

receiving from at least one of said plurality of client machines, a vote for the posted idea, wherein said vote is input via the control for casting the vote; and determining, by the host system, a Total Qualitative Management Criterion (TQMC) for the posted idea by weighting each vote based on when a vote is received, wherein a newer vote is weighted more than an older vote.

55. A system for rating posted ideas on a website, the system comprising:

a host system having a processor system, volatile memory, and non-volatile memory;

the non-volatile memory including at least one machine readable medium carrying one or more sequences of instructions for which when implemented causes the processor system to implement a method comprising:

sending a web page from a host system to a plurality client machines, the web page including at least a posted idea and a control for casting a vote for said posted idea;

receiving from at least one of said plurality of client machines, a vote for the posted idea, wherein said vote is input via the control for casting the vote; and determining, by the host system, a Total Qualitative Management Criterion (TQMC) for the posted idea by weighting each vote based on when a vote is received, wherein a newer vote is weighted more than an older vote.

* * * * *